US012616337B2

(12) United States Patent
Zhang

(10) Patent No.: US 12,616,337 B2
(45) Date of Patent: May 5, 2026

(54) BASKET WITH DETACHABLE COVER PLATE FOR AIR FRYER AND AIR FRYER HAVING BASKET WITH DETACHABLE COVER PLATE

(71) Applicant: NINGBO CARELINE ELECTRIC APPLIANCE CO., LTD., Ningbo (CN)

(72) Inventor: Yichi Zhang, Ningbo (CN)

(73) Assignee: NINGBO CARELINE ELECTRIC APPLIANCE CO., LTD., Ningbo (CN)

( * ) Notice: Subject to any disclaimer, the term of this patent is extended or adjusted under 35 U.S.C. 154(b) by 958 days.

(21) Appl. No.: 17/728,498

(22) Filed: Apr. 25, 2022

(65) Prior Publication Data

US 2022/0369862 A1 Nov. 24, 2022

(30) Foreign Application Priority Data

May 24, 2021 (CN) .......................... 202110566678.6
May 24, 2021 (CN) .......................... 202121122167.7
(Continued)

(51) Int. Cl.
*A47J 37/06* (2006.01)
*A47J 36/32* (2006.01)
(Continued)

(52) U.S. Cl.
CPC .......... *A47J 37/0664* (2013.01); *A47J 36/32* (2013.01); *A47J 37/0641* (2013.01); *F24C 7/067* (2013.01); *F24C 15/322* (2013.01); *F24H 3/02* (2013.01)

(58) Field of Classification Search
CPC ...... F24C 15/20; F24C 15/006; F24C 15/322; F24C 15/16; F24C 7/067; A47J 37/00;
(Continued)

(56) References Cited

U.S. PATENT DOCUMENTS 5,197,624 A * 3/1993 Dodaro .............. B65D 47/0833
220/269
2012/0043112 A1* 2/2012 Persson .................. H01H 33/42
174/158 R
(Continued)

FOREIGN PATENT DOCUMENTS

CN 102210556 A 10/2011
CN 104586233 A 5/2015
(Continued)

*Primary Examiner* — Steven W Crabb
*Assistant Examiner* — Allison E Helferty
(74) *Attorney, Agent, or Firm* — Dinsmore & Shohl LLP

(57) ABSTRACT

Provided are basket with detachable cover plate for air fryer and air fryer having basket with detachable cover plate. The basket includes basket body and handle provided at side of basket body, and top portion of basket body is of opening structure, cover plate matched with opening is provided at opening of basket, and cover plate is detachably installed at opening of basket; the air fryer includes cooking cavity located inside air fryer, and basket and hot air device provided inside cooking cavity, and hot air device is located above basket, when cover plate is installed on basket, interior of basket is hermetically isolated by cover plate from hot air device, and when cover plate is detached from upper opening of basket, interior of basket is in communication with hot air device.

11 Claims, 9 Drawing Sheets

(30)     Foreign Application Priority Data

| | | |
|---|---|---|
| May 24, 2021 | (CN) .......................... | 202121122217.1 |
| May 24, 2021 | (CN) .......................... | 202121125423.8 |

(51) Int. Cl.
| | |
|---|---|
| *F24C 7/06* | (2006.01) |
| *F24C 15/32* | (2006.01) |
| *F24H 3/02* | (2022.01) |

(58) Field of Classification Search
CPC .... A47J 37/0641; A47J 37/0664; A47J 36/32; F24H 3/02; F24H 3/04; F24H 3/06; F24H 3/12
See application file for complete search history.

(56)     References Cited

U.S. PATENT DOCUMENTS

| | | | | |
|---|---|---|---|---|
| 2019/0045964 A1* | 2/2019 | Gill | .......................... | A47J 27/04 |
| 2019/0142219 A1* | 5/2019 | Khang | .................... | A47J 37/06 126/1 R |

| | | | | |
|---|---|---|---|---|
| 2021/0059470 A1* | 3/2021 | Zhan | .................. | B65D 51/1611 |
| 2021/0219778 A1* | 7/2021 | Senders | .............. | A47J 37/0641 |
| 2022/0117439 A1* | 4/2022 | Mo | .......................... | A47J 36/32 |
| 2023/0015314 A1* | 1/2023 | Hietbrink | .............. | F24C 15/322 |
| 2023/0031394 A1* | 2/2023 | He | ......................... | A47J 27/086 |
| 2023/0200584 A1* | 6/2023 | Kennedy | .............. | A47J 27/086 99/403 |

FOREIGN PATENT DOCUMENTS

| | | | | | |
|---|---|---|---|---|---|
| CN | 105546265 | A | | 5/2016 | |
| CN | 106618182 | A | * | 5/2017 | |
| CN | 211130736 | U | | 7/2020 | |
| CN | 211936980 | U | | 11/2020 | |
| CN | 214964745 | U | | 12/2021 | |
| EP | 3583878 | A1 | | 12/2019 | |
| JP | 2005218482 | A | * | 8/2005 | |
| WO | WO-2015062197 | A1 | * | 5/2015 | ........... A47J 27/004 |
| WO | 2020163711 | A1 | | 8/2020 | |

* cited by examiner

BASKET WITH DETACHABLE COVER PLATE FOR AIR FRYER AND AIR FRYER HAVING BASKET WITH DETACHABLE COVER PLATE

CROSS-REFERENCE TO RELATED APPLICATION

The present disclosure claims the priority to the Chinese patent application with the filing number 202121122217.1, filed on May 24, 2021 with the Chinese Patent Office, and entitled "Air Fryer Having Basket with Detachable Cover Plate", the Chinese patent application with the filing number 202110566678.6, filed on May 24, 2021 with the Chinese Patent Office, and entitled "Air Outlet System of Air Fryer Having Detachable Cover Plate", the Chinese patent application with the filing number 202121125423.8, filed on May 24, 2021 with the Chinese Patent Office, and entitled "Air Fryer Having Bottom Heating System", and the Chinese patent application with the filing number 202121122167.7, filed on May 24, 2021 with the Chinese Patent Office, and entitled "Basket with Detachable Cover Plate for Air Fryer", the contents of which are incorporated herein by reference in entirety.

TECHNICAL FIELD

The present disclosure relates to the field of air fryers, and in particular to a basket with a detachable cover plate for an air fryer and an air fryer having a basket with a detachable cover plate.

BACKGROUND ART

The air fryer is a cooking appliance which is popular among people at present. A cooking cavity is provided in the air fryer, a hot air device consisting of a heating pipe and a heat circulation fan is provided in an upper portion of the cooking cavity, and it can form a heat circulating airflow in the cooking cavity to cook food in a basket. Such air fryer has a single cooking mode, namely only one mode of hot-air frying and baking, and cannot meet the increasing requirements of people on various functions of air fryer products. In addition, the baskets used by the current air fryers generally include a basket body and a handle provided at a side of the basket body, wherein the basket body is of a top opening structure, hot air above the cooking cavity directly enters the basket body through the opening to fry and bake the food, meanwhile, smoke and steam of the product in the basket body both directly contact the hot air device and other electrical devices through the opening, that is, this kind of basket for an air fryer cannot isolate the steam or the like of the product from the electrical devices in the cooking process, which will affect the reliability and the service life of the whole product. Therefore, in summary, the prior art needs to be improved.

SUMMARY

A basket with a detachable cover plate for an air fryer, including a basket body and a handle provided at a side of the basket body, a top portion of the basket body being of an opening structure, wherein a cover plate matched with the opening is provided at the opening of the basket, and the cover plate is detachably installed at the opening of the basket.

In one or more embodiments, the cover plate is snapped with the basket body, and one of the cover plate and the basket body is provided with a clamping groove, and the other is provided with a clamping position corresponding to the clamping groove.

In one or more embodiments, a plurality of clamping grooves opening in a same rotation direction are provided at intervals on a peripheral side of the cover plate, a plurality of corresponding clamping positions designed in a protruding manner are provided on a side wall of the basket body, and the clamping grooves are rotatably snapped with the clamping positions.

In one or more embodiments, the basket is a drawer-type basket, a gas outlet pipe is provided at an edge of the cover plate, the gas outlet pipe is in communication with an inner cavity of the basket body, and the gas outlet pipe is provided at a side opposite to the handle.

In one or more embodiments, a bottom of the basket body is provided with a thermally conductive plate closely attached to a bottom wall of the basket body.

In one or more embodiments, a plurality of inner concave portions are provided on the bottom wall of the basket body, installation bases are provided in the inner concave portions, the thermally conductive plate is provided with installation holes corresponding to the installation bases, and the fasteners penetrate through the installation holes to fix the thermally conductive plate on the installation bases, wherein a threaded hole is provided on each installation base, the fasteners are screws matched with the threaded holes, the installation holes are wedge-shaped holes, and nuts of the fasteners are embedded in the installation holes.

An air fryer having a basket with a detachable cover plate, including a cooking cavity located inside the air fryer, and a basket and a hot air device provided inside the cooking cavity, the basket being of an upper opening structure, the hot air device being located above the basket, wherein the basket is the above basket with a detachable cover plate for an air fryer, an interior of the basket is hermetically isolated by the cover plate from the hot air device, and when the cover plate is detached from the upper opening of the basket, the interior of the basket is in communication with the hot air device.

In one or more embodiments, a bottom heating device capable of heating the basket is provided at a bottom and/or a side portion of the cooking cavity.

In one or more embodiments, a bottom heating device capable of heating the basket is provided at the bottom of the cooking cavity, the bottom heating device includes a heating pipe, a first thermally conductive aluminum plate, and a metal shell which are connected in sequence from bottom to top, the metal shell is provided at the bottom of the cooking cavity, and the basket is supported on the metal shell.

In one or more embodiments, the air fryer further includes a control system and a cover plate sensing system electrically connected with each other, and the cover plate sensing system is provided correspondingly to the cover plate. when the cover plate is installed on the basket, the cover plate sensing system outputs a first signal to the control system; and when the cover plate is not installed on the basket, the cover plate sensing system outputs a second signal to the control system.

In one or more embodiments, the control system has a hot air device starting mode and a bottom heating device starting mode, when receiving a first signal, the control system controls to enter the bottom heating device starting mode; and when receiving a second signal, the control system controls to enter the hot air device starting mode, or controls to enter the hot air device starting mode and the bottom heating device starting mode at the same time.

In one or more embodiments, the cover plate sensing system includes a micro-switch assembly and an ejector rod, the micro-switch assembly is electrically connected to the control system, and two ends of the ejector rod are respectively provided correspondingly to the micro-switch assembly and the cover plate, wherein when the cover plate is installed on the basket, one end of the ejector rod abuts against the cover plate, and the other end drives the micro-switch assembly to be in a first position state, and the micro-switch assembly outputs the first signal to the control system; and when the cover plate is not installed on the basket, the cover plate does not abut against the ejector rod, the micro-switch assembly changes to a second position state, and the micro-switch assembly outputs a second signal to the control system.

In one or more embodiments, when the cover plate is installed on the basket, the interior of the basket is hermetically isolated by the cover plate from the hot air device, a gas outlet pipe in communication with an inner cavity of the basket is provided at an edge of the cover plate, and a first air outlet making the gas outlet pipe be in communication with the outside is provided on the air fryer.

In one or more embodiments, a sealing gasket is provided at a connection position between the first air outlet and the gas outlet pipe, when the cover plate is not installed on the basket, the sealing gasket blocks the first air outlet; and when the cover plate is installed on the basket, the sealing gasket is open, and the inner cavity of the basket is in communication with the outside through the gas outlet pipe and the first air outlet.

In one or more embodiments, the sealing gasket is formed by a plurality of flap-shaped sealing lips that can be turned outward, when the cover plate is installed on the basket, the gas outlet pipe is inserted into the sealing gasket, the plurality of flap-shaped sealing lips are pushed to be unfolded, the gas outlet pipe is in communication with the first air outlet; and when the cover plate is not installed on the basket, the plurality of flap-shaped sealing lips gather together and block the first air outlet.

In one or more embodiments, a hot air outlet corresponding to the hot air device is provided in an upper portion of the cooking cavity, and the air fryer is provided with a second air outlet making the hot air outlet be in communication with the outside; a cold air cavity is provided outside the cooking cavity, the cold air cavity is provided with a cold air outlet in communication with the second air outlet, and the cold air outlet is located correspondingly to a position of the hot air outlet.

In one or more embodiments, an opening of the second air outlet in communication with the outside is provided close to an opening of the first air outlet in communication with the outside.

In one or more embodiments, the first air outlet and the second air outlet are of a one-piece structure.

In one or more embodiments, the cover plate is snapped with the basket body, and one of the cover plate and the basket body is provided with a clamping groove, and the other is provided with a clamping position corresponding to the clamping groove, wherein a plurality of clamping grooves opening in a same rotation direction are provided at intervals on a peripheral side of the cover plate, a plurality of corresponding clamping positions designed in a protruding manner are provided on a side wall of the basket body, and the clamping grooves are rotatably snapped with the clamping positions.

In one or more embodiments, the basket is a drawer-type basket, a gas outlet pipe is provided at an edge of the cover plate, the gas outlet pipe is in communication with an inner cavity of the basket body, and the gas outlet pipe is provided at a side opposite to the handle, wherein a bottom of the basket body is provided with a thermally conductive plate closely attached to a bottom wall of the basket body, and wherein a plurality of inner concave portions are provided on the bottom wall of the basket body, installation bases are provided in the inner concave portions, the thermally conductive plate is provided with installation holes corresponding to the installation bases, and the fasteners penetrate through the installation holes to fix the thermally conductive plate on the installation bases, wherein a threaded hole is provided on each installation base, the fasteners are screws matched with the threaded holes, the installation holes are wedge-shaped holes, and nuts of the fasteners are embedded in the installation holes.

BRIEF DESCRIPTION OF DRAWINGS

In order to more clearly illustrate technical solutions of embodiments of the present disclosure, accompanying drawings which need to be used in the embodiments will be introduced briefly below, and it should be understood that the accompanying drawings below merely show some embodiments of the present disclosure, and therefore should not be considered as limitation to the scope, a person ordinarily skilled in the art still could obtain other relevant drawings according to these accompanying drawings, without using creative efforts.

Figure 1:
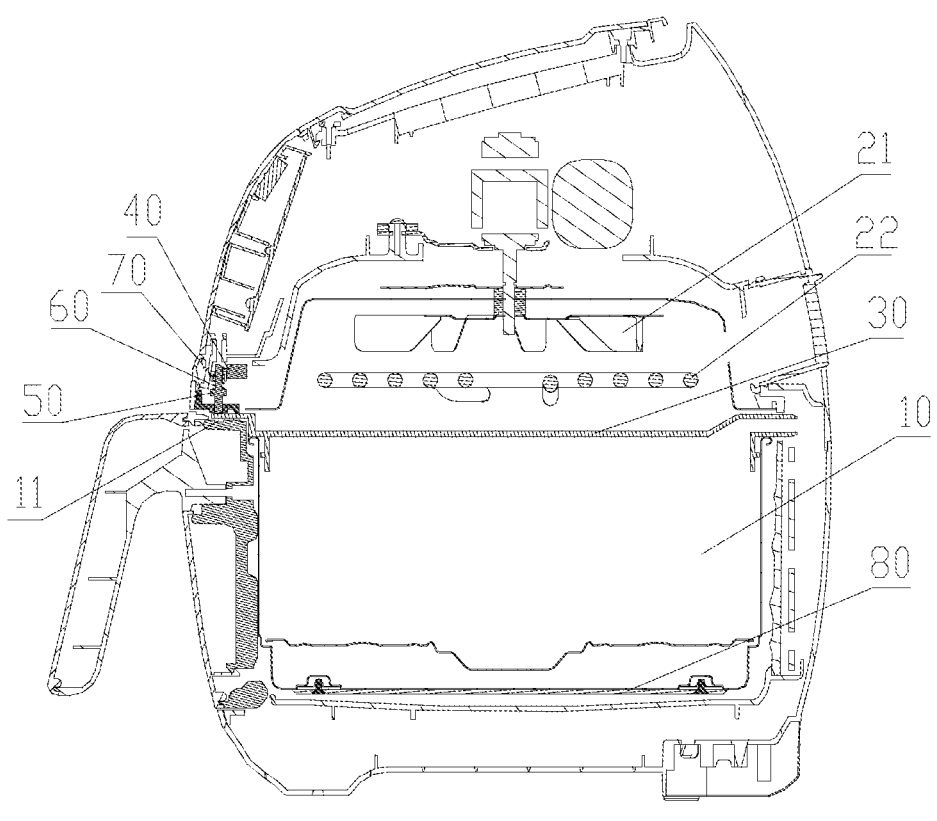
FIG. 1 is a structural schematic view when a cover plate is installed in the present disclosure.

Reference signs: 10—basket (basket body); 11—limiting recess; 20—hot air device; 21—heat circulation fan; 22—top heating pipe; 30—cover plate; 40—micro-switch assembly; 41—elastic sensing sheet; 50—ejector rod; 60—ejector rod spring; 70—limiting groove; 80—bottom heating device; 23—hot air outlet; 24—cold air outlet; 31—gas outlet pipe; 140—first air outlet; 150—sealing gasket; 160—bracket; 161—compression bone; 170—second air outlet; 90—frying plate; 1011—inner concave portion; 1030—bottom heating device; 1031—heating pipe; 1032—first thermally conductive aluminum plate; 1033—metal shell; 1034—annular protruding rim; 1040—second thermally conductive aluminum plate (second thermally conductive plate/thermally conductive plate); 1041—installation hole; 1050—installation base; 1051—threaded hole; 1060—fastener; 1070—lower bracket; 2011—clamping position; 2020—handle; 2031—clamping groove; 2032—gas outlet pipe; 2040—sealing ring.

DETAILED DESCRIPTION OF EMBODIMENTS

In order to make objectives, technical solutions, and advantages of the embodiments of the present disclosure clearer, the technical solutions in the embodiments of the present disclosure will be described clearly and completely below in conjunction with the accompanying drawings in the embodiments of the present disclosure, and apparently, some but not all embodiments of the present disclosure are described. Generally, components in the embodiments of the present disclosure described and shown in the accompanying drawings herein may be arranged and designed in various different configurations.

Therefore, the detailed description below of the embodiments of the present disclosure provided in the accompanying drawings is not intended to limit the scope of protection of the present disclosure, but merely represents selected embodiments of the present disclosure. All other embodiments, obtained by a person ordinarily skilled in the art based on the embodiments in the present disclosure without creative efforts, shall fall within the scope of protection of the present disclosure.

It should be noted that similar reference signs and letters represent similar items in the following accompanying drawings, therefore, once a certain item is defined in one accompanying drawing, it is not needed to be further defined or explained in subsequent accompanying drawings.

In the description of the present disclosure, it should be indicated that orientation or positional relationships indicated by terms such as "upper", "lower", "inner", and "outer", if present, are based on orientation or positional relationships as shown in the drawings, or orientation or positional relationships of a product when being conventionally placed in use, merely for facilitating describing the present disclosure and simplifying the description, rather than indicating or suggesting that related devices or elements have to be in the specific orientation or configured and operated in a specific orientation, therefore, they should not be construed as limiting the present disclosure. Besides, terms such as "first" and "second", if appear, are merely for distinctive description, but should not be construed as indicating or implying importance in the relativity.

Moreover, the terms "horizontal", "vertical", "overhanging", and the like do not mean that the parts are required to be absolutely horizontal or overhanging, but may be slightly inclined. For example, by "horizontal" it merely means that a structure is more horizontal in comparison with "vertical", rather than being completely horizontal, while the structure can be slightly inclined.

In the description of the present disclosure, it should be further illustrated that, unless otherwise specifically regulated and defined, the terms "provide", "install", "link", and "connect" should be understood in a broad sense, for example, a connection may be a fixed connection, a detachable connection, or an integrated connection; it may be a mechanical connection or an electrical connection; it may be direct joining or indirect joining through an intermediate medium, and it also may be inner communication between two elements. For a person ordinarily skilled in the art, specific meanings of the above-mentioned terms in the present disclosure could be understood according to specific circumstances.

It should be noted that the features of the embodiments in the present disclosure may be combined with each other if there is no conflict.

The present disclosure provides an air fryer having a basket with a detachable cover plate, which can realize sealed isolation of a food cavity in the basket from a hot air device above the cooking cavity, making the air fryer have richer functions.

In order to achieve the above objective, the present disclosure provides a technical solution as follows: an air fryer having a basket with a detachable cover plate, including a cooking cavity located inside the air fryer, and a basket and a hot air device provided inside the cooking cavity. The basket is of an upper opening structure, the hot air device is located above the basket, and a detachable cover plate is provided at the upper opening of the basket. When the cover plate is installed on the basket, an interior of the basket is hermetically isolated by the cover plate from the hot air device, and when the cover plate is detached from the upper opening of the basket, the interior of the basket is in communication with the hot air device.

In one or more embodiments, a bottom heating device capable of heating the basket is provided at a bottom and/or a side portion of the cooking cavity.

In one or more embodiments, the air fryer further includes a control system and a cover plate sensing system electrically connected with each other, and the cover plate sensing system is provided correspondingly to the cover plate. When the cover plate is installed on the basket, the cover plate sensing system outputs a first signal to the control system; and when the cover plate is not installed on the basket, the cover plate sensing system outputs a second signal to the control system.

In one or more embodiments, the control system has a hot air device starting mode and a bottom heating device starting mode.

When receiving a first signal, the control system controls to enter the bottom heating device starting mode.

When receiving a second signal, the control system controls to enter the hot air device starting mode, or controls to enter the hot air device starting mode and the bottom heating device starting mode at the same time.

In one or more embodiments, the cover plate sensing system comprises a micro-switch assembly and an ejector rod, the micro-switch assembly is electrically connected to the control system, and two ends of the ejector rod are respectively provided correspondingly to the micro-switch assembly and the cover plate.

When the cover plate is installed on the basket, one end of the ejector rod abuts against the cover plate, and the other end drives the micro-switch assembly to be in a first position state, and the micro-switch assembly outputs the first signal to the control system.

When the cover plate is not installed on the basket, the cover plate releases the abutment against the ejector rod, the micro-switch assembly changes to a second position state, and the micro-switch assembly outputs a second signal to the control system.

In one or more embodiments, the micro-switch assembly includes an elastic sensing sheet, the elastic sensing sheet abuts against one end portion of the ejector rod, and the other end portion of the ejector rod is provided correspondingly to the cover plate.

In one or more embodiments, the cover plate sensing system further includes an ejector rod spring, the ejector rod spring is sleeved on the ejector rod, and the ejector rod spring pushes the ejector rod to move towards a side where the cover plate is located.

In one or more embodiments, the air fryer is provided with a limiting groove corresponding to the ejector rod and the ejector rod spring, and the ejector rod and the ejector rod spring are installed in the limiting groove.

In one or more embodiments, the cover plate sensing system is provided above the basket, and a lower end of the ejector rod extends downwards to abut against a top surface of the cover plate.

In one or more embodiments, a limiting recess corresponding to the ejector rod is provided on the top of the basket, and when the cover plate is not installed on the basket, the lower end of the ejector rod extends into the limiting recess.

Compared with the prior art, the present disclosure has the following beneficial effects.

By providing the detachable cover plate on the basket, it can be realized that when the cover plate is detached, the interior of the basket is in communication with the hot air device, and the conventional hot-air frying-and-baking function can be performed; after the cover plate is installed, the interior of the basket is hermetically isolated by the cover plate from the hot air device, in this case, the broiling and baking or the steaming function can be performed in the basket, without affecting the service life and reliability of the hot air device, that is, the functions of the air fryer can be enriched; and the bottom heating device capable of heating the basket is provided at the bottom and/or the side portion of the cooking cavity, which can provide heat for the broiling and baking or the steaming function performed in the basket, and simplifies the product structure.

By detecting whether the cover plate is in an installation state by the cover plate sensing system, and controlling the air fryer to start the hot air device starting mode and the bottom heating device starting mode according to the installation state of the cover plate, the air fryer product can be more intelligent, and meanwhile it avoids starting the steaming function when the cover plate is not installed, that is, avoiding the steam from damaging and affecting the hot air device and other electrical devices, thus rendering stronger practicability to the product.

The cover plate sensing system includes the micro-switch assembly and the ejector rod, wherein the ejector rod is configured to mechanically contact the cover plate to produce displacement, and push the micro-switch assembly to produce a corresponding judgment signal, with a simple and reliable structure; besides, when the cover plate is not installed on the basket, the ejector rod further can be snapped in the limiting groove on the basket to limit the position of the basket, which can further improve the practicability of the product.

The present disclosure further provides an air outlet system of an air fryer having a detachable cover plate, which can realize sealed isolation of a food cavity in the basket from a hot air device above a cooking cavity, and realize more cooking functions, meanwhile, efficient operation can be ensured through the air outlet system when new functions are being used.

In order to achieve the above objectives, the present disclosure provides a technical solution as follows: an air outlet system of an air fryer having a detachable cover plate, wherein a cooking cavity is provided inside the air fryer, the cooking cavity is provided therein with a basket and a hot air device, the basket is of an upper opening structure, the hot air device is located above the basket, and a detachable cover plate is provided at an upper opening of the basket. When the cover plate is installed on the basket, the interior of the basket is hermetically isolated by the cover plate from the hot air device. A gas outlet pipe in communication with an inner cavity of the basket is provided at an edge of the cover plate, and a first air outlet making the gas outlet pipe be in communication with the outside is provided on the air fryer.

In one or more embodiments, a sealing gasket is provided at a connection position between the first air outlet and the gas outlet pipe, when the cover plate is not installed on the basket, the sealing gasket blocks the first air outlet; and when the cover plate is installed on the basket, the sealing gasket is open, and the inner cavity of the basket is in communication with the outside through the gas outlet pipe and the first air outlet.

In one or more embodiments, the sealing gasket is formed by a plurality of flap-shaped sealing lips that can be turned outward, when the cover plate is installed on the basket, the gas outlet pipe is inserted into the sealing gasket, the plurality of flap-shaped sealing lips are pushed to expand, the gas outlet pipe is in communication with the first air outlet; and when the cover plate is not installed on the basket, the plurality of flap-shaped sealing lips gather together and block the first air outlet.

In one or more embodiments, the sealing gasket is formed by four flap-shaped sealing lips, and the four flap-shaped sealing lips form a cross-shaped structure.

In one or more embodiments, the air fryer includes a bracket for installing the first air outlet, and the sealing gasket is clamped and fixed at a connection position between the bracket and the first air outlet.

In one or more embodiments, a hot air outlet corresponding to the hot air device is provided in an upper portion of the cooking cavity, and the air fryer is provided with a second air outlet making the hot air outlet be in communication with the outside.

In one or more embodiments, a cold air cavity is provided outside the cooking cavity, the cold air cavity is provided with a cold air outlet in communication with the second air outlet, and the cold air outlet is corresponding to a position of the hot air outlet.

In one or more embodiments, an opening of the second air outlet in communication with the outside is provided close to an opening of the first air outlet in communication with the outside.

In one or more embodiments, the first air outlet and the second air outlet are of a one-piece structure.

In one or more embodiments, a bottom heating device capable of heating the basket is provided at a bottom and/or a side portion of the cooking cavity.

Compared with the prior art, the present disclosure has the following beneficial effects.

By providing the detachable cover plate on the basket, it can be realized that when the cover plate is detached, the interior of the basket is in communication with the hot air device and the conventional hot-air frying-and-baking function can be performed; after the cover plate is installed, the interior of the basket is hermetically isolated by the cover plate from the hot air device, in this case, the broiling and baking or the steaming function can be performed in the basket, without affecting the service life and reliability of the hot air device, that is, the functions of the air fryer can be enriched; meanwhile, the edge of the cover plate is provided with the gas outlet pipe in communication with the inner cavity of the basket, the gas outlet pipe is in communication with the outside through the first air outlet, then the smoke or steam generated during the broiling and baking or the steaming function can be discharged, ensuring that corresponding functions are performed efficiently and reliably. Besides, the bottom heating device capable of heating the basket is provided at the bottom and/or the side portion of the cooking cavity, which can provide heat for the broiling and baking or the steaming function performed in the basket, and simplifies the product structure.

The sealing gasket is provided at the joint between the first air outlet and the gas outlet pipe, only when the cover plate is installed on the basket, the sealing gasket is open, allowing the inner cavity of the basket to be in communication with the outside through the gas outlet pipe and the first air outlet, then the smoke or steam generated during the broiling and baking or the steaming function can be discharged; and when the cover plate is not installed on the basket, i.e., when the conventional hot-air frying and baking is carried out, the sealing gasket blocks the first air outlet, avoiding loss of the hot air from the first air outlet, and thus ensuring the practicability of the product. Besides, during the conventional hot-air frying and baking, the smoke and exhaust can be discharged through the hot air outlet and the second air outlet, preferably being mixed with cold air before being discharged, with quite strong practicability. Meanwhile, the opening of the second air outlet is provided close to the opening of the first air outlet, and the first air outlet and the second air outlet are of a one-piece structure, so that the structure is simple and convenient to install, and meanwhile the appearance of the product is more beautiful.

The sealing gasket is formed by a plurality of flap-shaped sealing lips that can be turned outward, and when the cover plate is installed on the basket, the gas outlet pipe is inserted into the sealing gasket, the plurality of flap-shaped sealing lips are pushed to expand, and the gas outlet pipe is in communication with the first air outlet; and when the cover plate is not installed on the basket, the plurality of flap-shaped sealing lips gather together and block the first air outlet, then the sealing gasket has a simple structure and a low cost, and the sealing is reliable.

The present disclosure further provides an air fryer having a bottom heating system, which can realize the cooking of food in a basket by heating a bottom of the basket, and can enrich the functions of the air fryer.

In order to achieve the above objectives, the present disclosure provides a technical solution as follows: an air fryer having a bottom heating system includes a cooking cavity provided inside the air fryer, and a basket and a hot air device provided inside the cooking cavity. The basket is of an upper opening structure, the hot air device is located above the basket, and a bottom heating device capable of heating the basket is provided at the bottom of the cooking cavity. The bottom heating device includes a heating pipe, a first thermally conductive aluminum plate, and a metal shell which are connected in sequence from bottom to top, wherein the metal shell is provided at the bottom of the cooking cavity, and the basket is supported on the metal shell.

In one or more embodiments, the bottom of the basket is provided with a second thermally conductive aluminum plate closely attached to a bottom wall of the basket, and the second thermally conductive aluminum plate is closely attached to and connected to the metal shell.

In one or more embodiments, the second thermally conductive aluminum plate is adhered to the bottom wall of the basket.

In one or more embodiments, installation bases are provided at the bottom of the basket, and the second thermally conductive aluminum plate is fixed on the installation bases through fasteners.

In one or more embodiments, a plurality of inner concave portions are provided on the bottom wall of the basket, installation bases are provided in the inner concave portions, the second thermally conductive aluminum plate is provided with installation holes corresponding to the installation bases, and the fasteners penetrate through the installation holes to fix the second thermally conductive aluminum plate on the installation bases.

In one or more embodiments, a threaded hole is provided on each installation base, the fasteners are screws matched with the threaded holes, the installation holes are wedge-shaped holes, and nuts of the fasteners are embedded in the installation holes.

In one or more embodiments, a lower bracket is provided at the bottom of the air fryer, the metal shell is fixed on the lower bracket, and an upper surface of the metal shell constitutes the bottom wall of the cooking cavity.

In one or more embodiments, an edge of the metal shell is provided with an annular protruding rim, and the bottom of the basket is located in an area enclosed by the annular protruding rim.

In one or more embodiments, a frying plate is provided inside the basket, a supporting portion corresponding to the frying plate is provided on an inner side of the basket, and a gap exists between the frying plate and a bottom surface of the basket.

In one or more embodiments, a detachable cover plate is provided at an upper opening of the basket, when the cover plate is installed on the basket, the interior of the basket is hermetically isolated by the cover plate from the hot air device, and when the cover plate is detached from the upper opening of the basket, the interior of the basket is in communication with the hot air device.

Compared with the prior art, the present disclosure has the following beneficial effects.

The bottom heating system can directly heat the bottom of the basket to broil and bake or steam the food in the basket, then the functions of the air fryer can be enriched; meanwhile, the heat of the bottom heating pipe is quickly and uniformly conducted by the first thermally conductive aluminum plate, so that the temperature of the metal shell is higher and more uniform, and thus the heating effect on the basket is better; further, the bottom of the basket is provided with the second thermally conductive aluminum plate, which can further improve the heat conduction efficiency and ensure a better heating effect.

The metal shell is fixed on the lower bracket, and the upper surface of the metal shell forms the bottom wall of the cooking cavity, which can simplify the structure of the whole cooking cavity and has a better bottom heating effect; in addition, the edge of the metal shell is provided with the annular protruding rim, and the bottom of the basket is located in the area enclosed by the annular protruding rim, which can further improve the heating efficiency.

By providing the detachable cover plate on the basket, it can be realized that when the cover plate is detached, the interior of the basket is in communication with the hot air device, and the conventional hot-air frying-and-baking function can be performed; after the cover plate is installed, the interior of the basket is hermetically isolated by the cover plate from the hot air device, in this case, the broiling and baking or the steaming function can be performed in the basket, without affecting the service life and reliability of the hot air device, that is, the functions of the air fryer can be enriched.

The present disclosure further provides a basket with a detachable cover plate for an air fryer, which can realize making the basket be in open state and closed state, so that more cooking functions of the air fryer can be better matched.

In order to achieve the above objectives, the present disclosure provides a technical solution as follows: a basket with a detachable cover plate for an air fryer includes a basket body and a handle provided at a side of the basket body, wherein a top portion of the basket body is of an opening structure, a cover plate matched with the opening is provided at the opening of the basket, and the cover plate is detachably installed at the opening of the basket.

In one or more embodiments, a sealing ring is provided between the cover plate and the basket body, and the sealing ring is sleeved on the cover plate.

In one or more embodiments, the cover plate is snapped with the basket body, and one of the cover plate and the basket body is provided with a clamping groove, and the other is provided with a clamping position corresponding to the clamping groove.

In one or more embodiments, a plurality of clamping grooves opening in a same rotation direction are provided at intervals on a peripheral side of the cover plate, a plurality of corresponding clamping positions designed in a protruding manner are provided on a side wall of the basket body, and the clamping grooves are rotatably snapped with the clamping positions.

In one or more embodiments, the basket is a drawer-type basket, a gas outlet pipe is provided at an edge of the cover plate, the gas outlet pipe is in communication with an inner cavity of the basket body, and the gas outlet pipe is provided at a side opposite to the handle.

In one or more embodiments, a bottom of the basket body is provided with a thermally conductive plate closely attached to a bottom wall of the basket body.

In one or more embodiments, the thermally conductive plate is adhered to the bottom wall of the basket body.

In one or more embodiments, a plurality of inner concave portions are provided on the bottom wall of the basket body, installation bases are provided in the inner concave portions, the thermally conductive plate is provided with installation holes corresponding to the installation bases, and the fasteners penetrate through the installation holes to fix the thermally conductive plate on the installation bases.

In one or more embodiments, a threaded hole is provided on each installation base, the fasteners are screws matched with the threaded holes, the installation holes are wedge-shaped holes, and nuts of the fasteners are embedded in the installation holes.

In one or more embodiments, a frying plate is provided inside the basket body, a supporting portion corresponding to the frying plate is provided on an inner side of the basket body, and a gap exists between the frying plate and a bottom surface of the basket body.

Compared with the prior art, the present disclosure has the following beneficial effects.

By providing the detachable cover plate on the basket, it can be realized that when the cover plate is detached, the interior of the basket is in communication with the hot air device and the conventional hot-air frying-and-baking function can be performed; after the cover plate is installed, the interior of the basket is hermetically isolated by the cover plate from the hot air device, in this case, the broiling and baking or the steaming function can be performed in the basket, without affecting the service life and reliability of the hot air device, that is, the functions of the air fryer can be enriched.

The cover plate is installed on the basket body in a rotary snapping manner, which is quite convenient to disassemble and assemble; meanwhile, the edge of the cover plate is provided with the gas outlet pipe, which can guide out the steam and the like generated when cooking food by the basket body, making the cooking more efficient and more reliable.

The bottom of the basket body is provided with the thermally conductive plate, which can further improve the heat conduction efficiency and ensure a better heating effect; and the thermally conductive plate is tightly fixed on the bottom wall of the basket body through the fasteners, and the nuts of the fasteners are embedded in the installation holes, so that the bottom of the basket is flat, thereby facilitating placement and meanwhile providing a beautiful appearance.

The embodiments of the present disclosure are further described in detail below with reference to the accompanying drawings.

Figure 2:
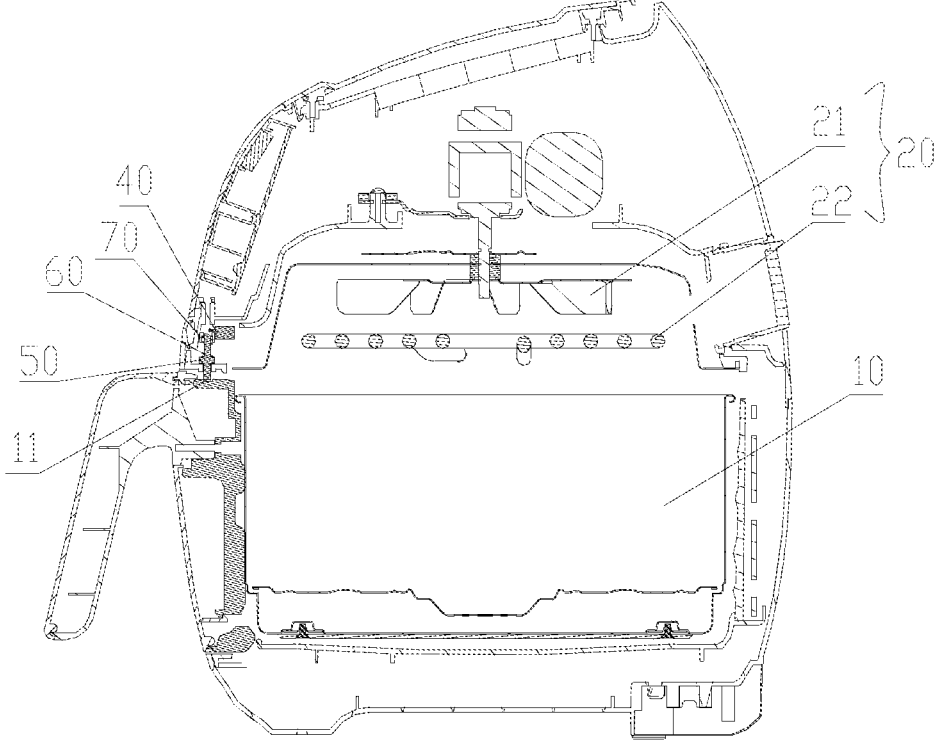
FIG. 2 is a structural schematic view when the cover plate is not installed in the present disclosure.
Figure 3:
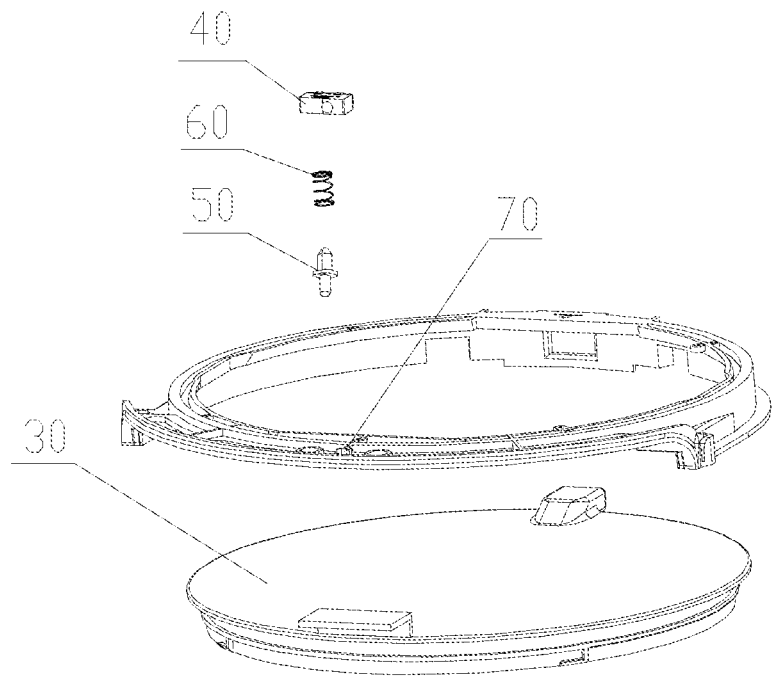
FIG. 3 is a structural schematic view of a cover plate sensing system of the present disclosure.

As shown in FIGS. 1-3, this embodiment provides an air fryer having a basket with a detachable cover plate, including a cooking cavity located inside the air fryer, and a basket 10 and a hot air device 20 provided in the cooking cavity. The basket 10 is of an upper opening structure, the hot air device 20 is located above the basket 10, and a detachable cover plate 30 is provided at the upper opening of the basket 10. When the cover plate 30 is installed on the basket 10, an interior of the basket 10 is hermetically isolated by the cover plate 30 from the hot air device 20, and when the cover plate 30 is detached from the upper opening of the basket 10, the interior of the basket 10 is in communication with the hot air device 20. By providing the detachable cover plate 30 on the basket 10, it can be realized that when the cover plate 30 is detached, the interior of the basket 10 is in communication with the hot air device 20 and the conventional hot-air frying-and-baking function can be performed; after the cover plate 30 is installed, the interior of the basket 10 is hermetically isolated by the cover plate 30 from the hot air device 20, in this case, the broiling and baking or steaming function can be performed in the basket 10, smoke and steam generated in the basket 10 are isolated by the cover plate 30, avoiding contact with the hot air device 20 and other electrical devices, thus, the service life and reliability of the air fryer will not be affected, that is, the practicability of the air fryer is ensured while the functions of the air fryer is enriched.

In the present embodiment, the hot air device 20 includes a heat circulation fan 21 and a top heating pipe 22, wherein the heat circulation fan 21 is located right above the top heating pipe 22, the top heating pipe 22 is located right above the basket 10, the top heating pipe 22 can heat a circulating airflow driven by the heat circulation fan 21, and the heated hot airflow is blown into the basket 10, and can fry and bake the food in the basket.

In the present embodiment, a bottom heating device 80 capable of heating the basket 10 is provided at the bottom of the cooking cavity, and the bottom heating device 80 can provide heat for the broiling and baking or steaming function performed in the basket 10, so that the air fryer has richer cooking functions. Without doubt, a design position of the bottom heating device 80 in the present disclosure is not limited thereto, and in another embodiment, the bottom heating device capable of heating the basket 10 may be provided at a side portion of the cooking cavity, and it may also provide heat for the broiling and baking or steaming function performed in the basket 10.

In the present embodiment, the air fryer further includes a control system and a cover plate sensing system electrically connected with each other, and the cover plate sensing system is provided correspondingly to the cover plate 30. When the cover plate 30 is installed on the basket 10, the cover plate sensing system outputs the first signal to the control system; and when the cover plate 30 is not installed on the basket 10, the cover plate sensing system outputs a second signal to the control system. By detecting whether the cover plate 30 is in an installation state by the cover plate sensing system, and controlling the air fryer to make the hot air device 20 start operation and make the bottom heating device 80 start operation according to the installation state of the cover plate 30, the air fryer product can be more intelligent. In the present embodiment, specifically, the control system has a hot air device starting mode and a bottom heating device starting mode, and when receiving a first signal, the control system controls to enter the bottom heating device starting mode; and when receiving a second signal, the control system controls to enter the hot air device starting mode, or controls to enter the hot air device starting mode and the bottom heating device starting mode at the same time, i.e., only when the cover plate 30 is installed on the basket 10, the control system can perform the bottom heating device starting mode, and carry out the steaming function or the like, because in this case, the cover plate 30 can block the steam generated in the steaming function, and can avoid the steam from contacting the hot air device 20 and other electrical devices, then the practicability and reliability of the product can be ensured by means of electronic control. When the cover plate 30 is not installed on the basket 10, the basket 10 is open, in this case, it can be controlled to enter the hot air device starting mode, to perform the conventional hot-air frying-and-baking function. Without doubt, it may also be controlled to enter the hot air device starting mode and the bottom heating device starting mode at the same time, in this case, both upper and lower heating systems simultaneously heat the circulating hot air in the basket 10, then the overall heating efficiency is higher.

In the present embodiment, the cover plate sensing system includes a micro-switch assembly 40 and an ejector rod 50, wherein the micro-switch assembly 40 is electrically connected to the control system, and two ends of the ejector rod 50 are respectively provided correspondingly to the micro-switch assembly 40 and the cover plate 30. When the cover plate 30 is installed on the basket 10, one end of the ejector rod 50 abuts against the cover plate 30, and the other end drives the micro-switch assembly 40 to be in a first position state, the micro-switch assembly 40 outputs the first signal to the control system, in this case, the control system controls to enter the bottom heating device starting mode, and the steaming function can be started; and when the cover plate 30 is not installed on the basket 10, the cover plate 30 releases the abutment against the ejector rod 50, the micro-switch assembly 40 changes to a second position state, and the micro-switch assembly 40 outputs a second signal to the control system, in this case, the control system controls to enter the hot air device starting mode, or controls to enter the hot air device starting mode and the bottom heating device starting mode at the same time, and cannot start the steaming function.

In the present embodiment, the cover plate sensing system further includes an ejector rod spring 60. The ejector rod spring 60 is sleeved on the ejector rod 50, and the ejector rod spring 60 pushes the ejector rod 50 to move towards a side where the cover plate 30 is located, i.e., the ejector rod spring 60 makes the ejector rod 50 maintain a tendency of moving towards the cover plate 30, realizing a significant change in the position of the ejector rod 50 when the cover plate 30 is in two states of being installed or not installed, thus the installation state of the cover plate 30 is accurately acquired, and the signal is accurately sent to the micro-switch assembly 40. In the present embodiment, the air fryer is provided with a limiting groove 70 corresponding to the ejector rod 50 and the ejector rod spring 60, and the ejector rod 50 and the ejector rod spring 60 are installed in the limiting groove 70, thereby it can be ensured that the ejector rod 50 and the micro-switch assembly 40 can be reliably fitted, ensuring to accurately detect the installation state of the cover plate 30, thereby ensuring the reliability of the product.

Preferably, in the present embodiment, the cover plate sensing system is provided above the basket 10, and a lower end of the ejector rod 50 extends downwards to abut against a top surface of the cover plate 30, thus, a space above the basket 10 in the air fryer can be fully utilized, and meanwhile the ejector rod 50, under its own gravity, also has a tendency of moving downwards, which can ensure that even in the case where the ejector rod spring ages, judgment of the installation state of the cover plate 30 by the ejector rod 50 is also relatively accurate, thus further ensuring the reliability of the product. Meanwhile, in the present embodiment, the ejector rod 50 is provided on a side where the handle of the drawer-type basket is located, a limiting recess 11 corresponding to the ejector rod 50 is provided on the top of the basket 10, and when the cover plate 30 is not installed on the basket 10, the lower end of the ejector rod 50 extends into the limiting recess 11, so that the basket 10 can be limited, preventing the basket 10 from slipping out from the cooking cavity during the cooking process. By means of this design, the ejector rod 50 not only can detect the installation state of the cover plate 30, but also can limit the basket 10 when the cover plate 30 is not installed, further improving the practicability of the product.

Figure 4:
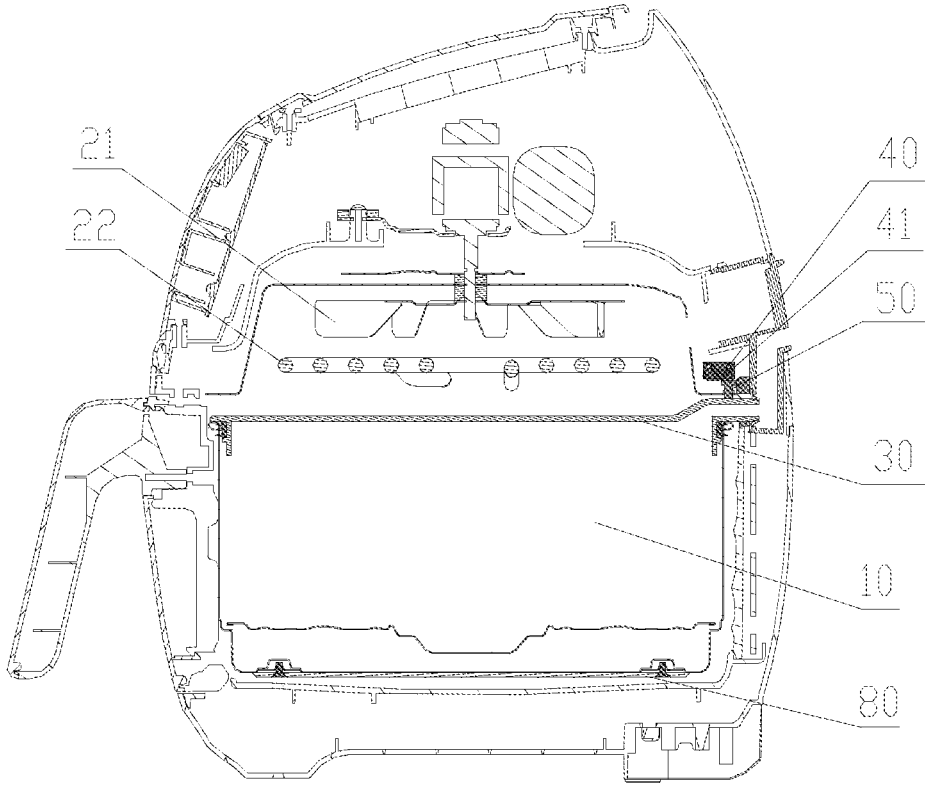
FIG. 4 is another structural schematic view when the cover plate is installed in the present disclosure.
Figure 5:
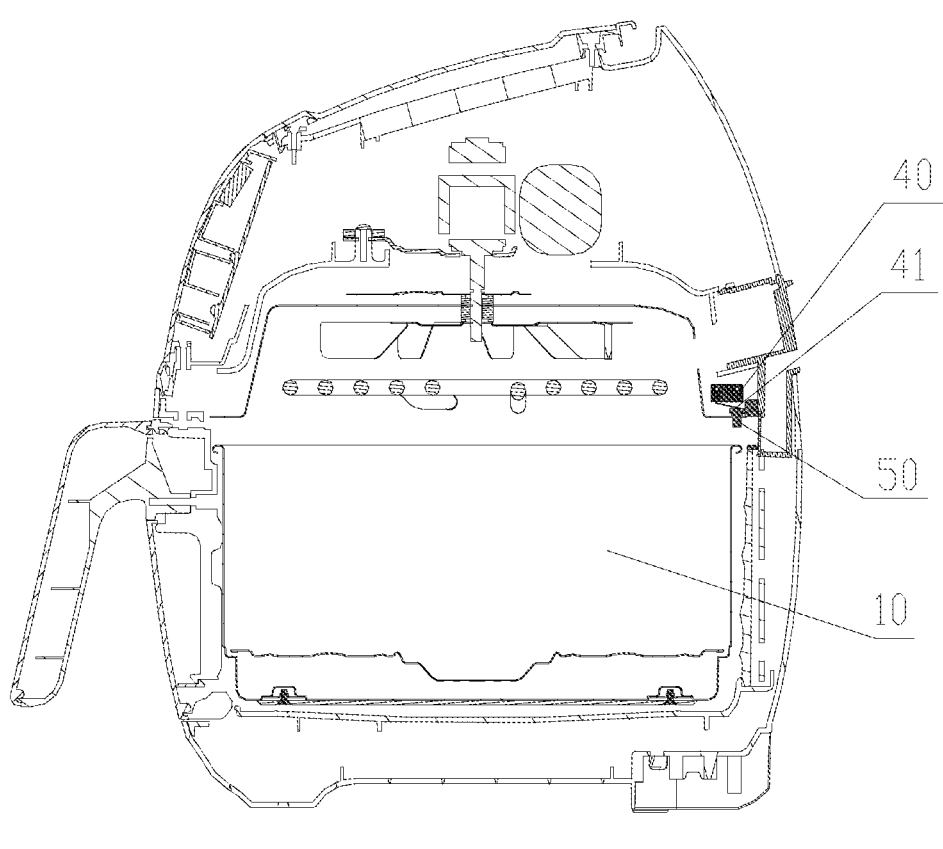
FIG. 5 is another structural schematic view when the cover plate is not installed in the present disclosure.
Figure 6:
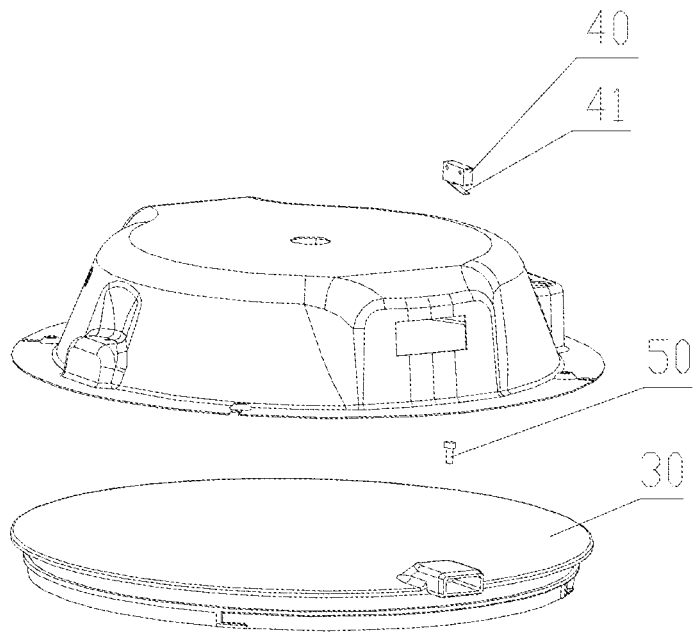
FIG. 6 is another structural schematic view of the cover plate sensing system of the present disclosure.

As shown in FIGS. 4-6, in this embodiment, the micro-switch assembly 40 includes an elastic sensing sheet 41, the elastic sensing sheet 41 abuts against one end portion of the ejector rod 50, and the other end portion of the ejector rod 50 is provided correspondingly to the cover plate 30. The elastic sensing sheet 41 makes the ejector rod 50 maintain a tendency of moving towards the cover plate 30, realizing a significant change in the position of the ejector rod 50 when the cover plate 30 is in two states of being installed or not installed, thus the installation state of the cover plate 30 is accurately acquired, and the signal is accurately sent to the micro-switch assembly 40. In the present embodiment, the ejector rod 50 is provided above an edge of the basket 10 away from the side where the handle of the basket is located, and the lower end of the ejector rod 50 extends downwards to abut against the top surface of the cover plate 30, thus, the space above the basket 10 in the air fryer can be fully utilized, and meanwhile the ejector rod 50, under its own gravity, also has a tendency of moving downwards, which can ensure that even in the case where the ejector rod spring ages and fails, judgment of the installation state of the cover plate 30 by the ejector rod 50 is also relatively accurate, thus ensuring the reliability of the product.

Figure 7:
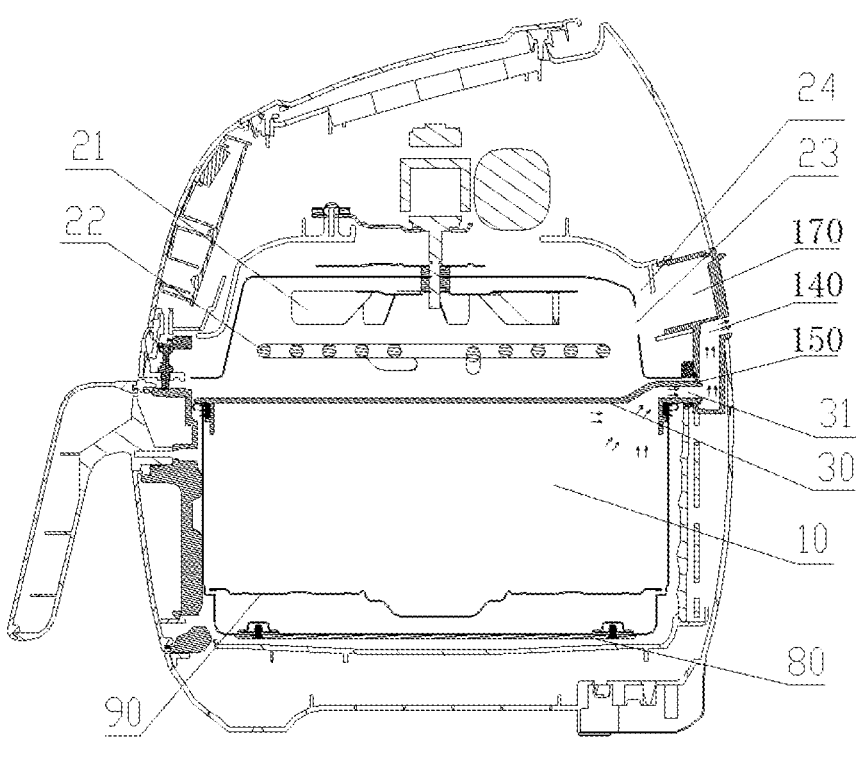
FIG. 7 is a further structural schematic view when the cover plate is installed in the present disclosure.
Figure 8:
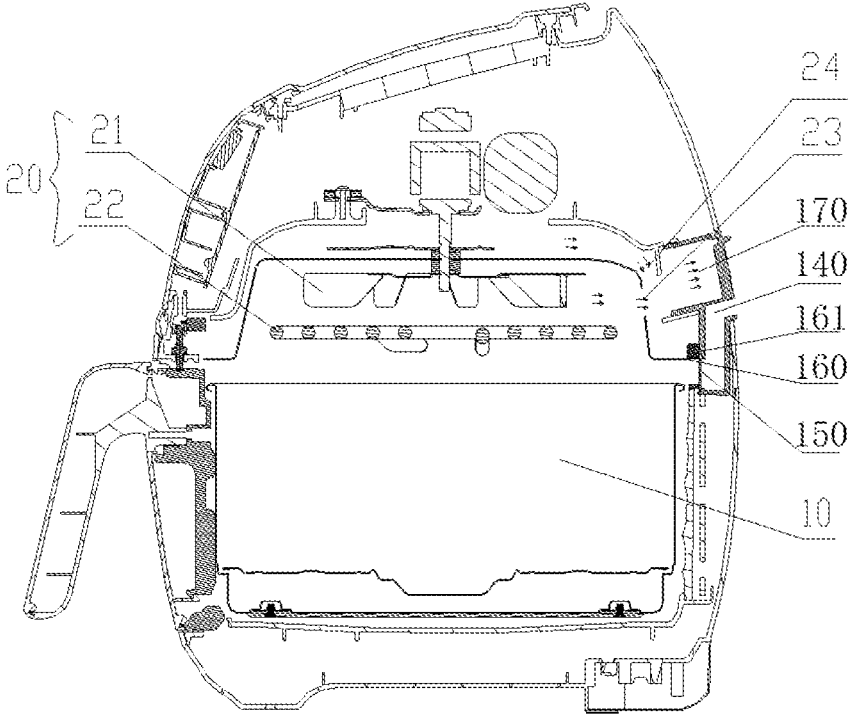
FIG. 8 is a further structural schematic view when the cover plate is not installed in the present disclosure.
Figure 9:
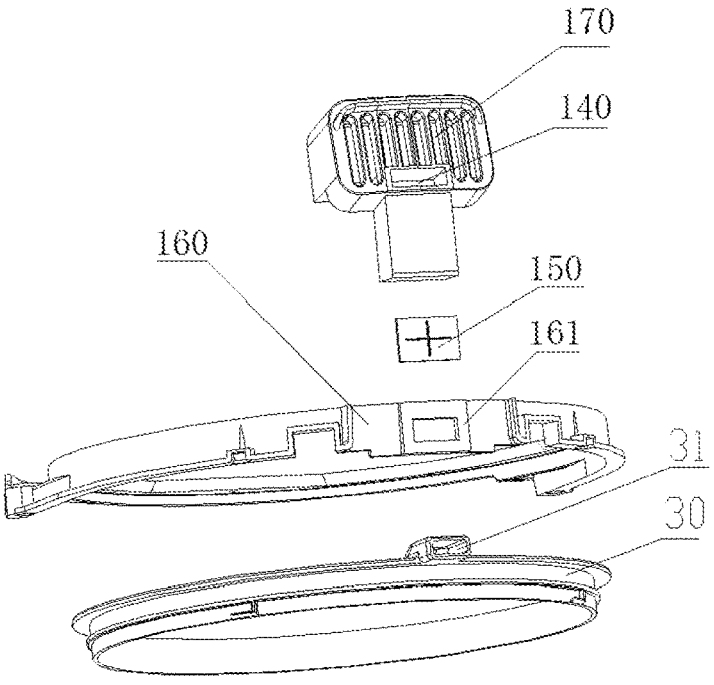
FIG. 9 is a partial exploded schematic view of the present disclosure.
Figure 10:
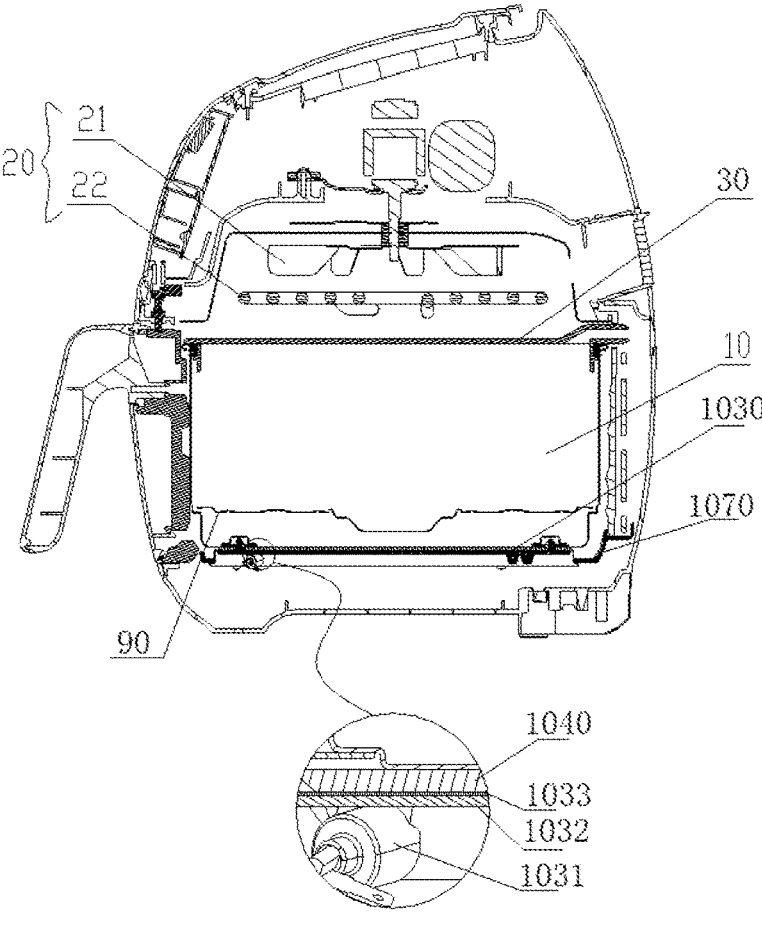
FIG. 10 is a structural schematic view of the present disclosure.
Figure 11:
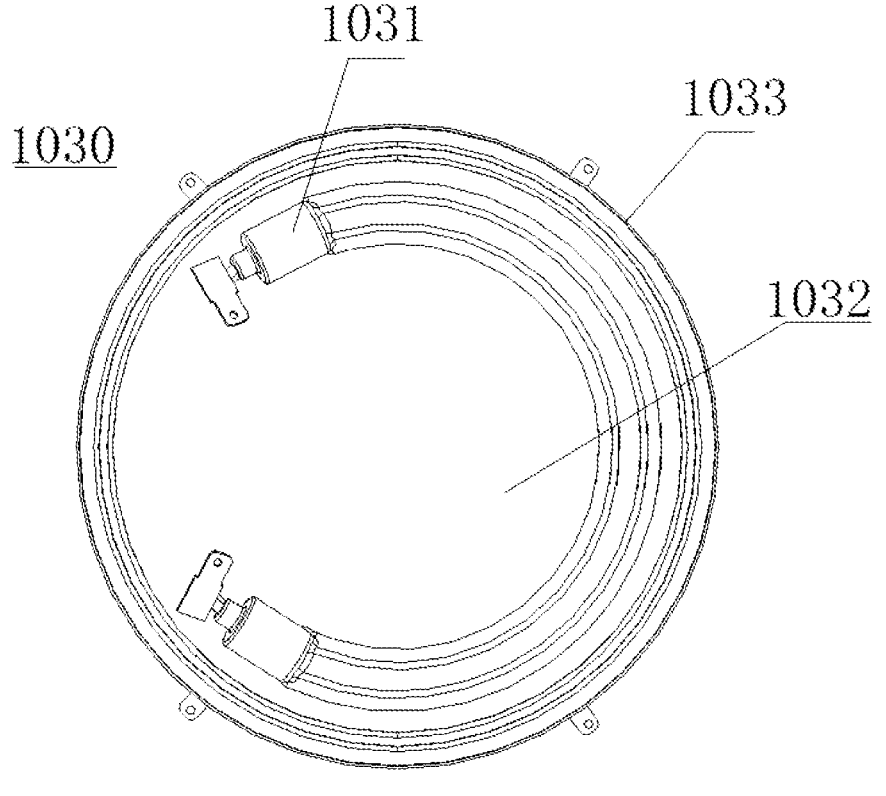
FIG. 11 is a structural schematic view of a bottom heating system of the present disclosure.
Figure 12:
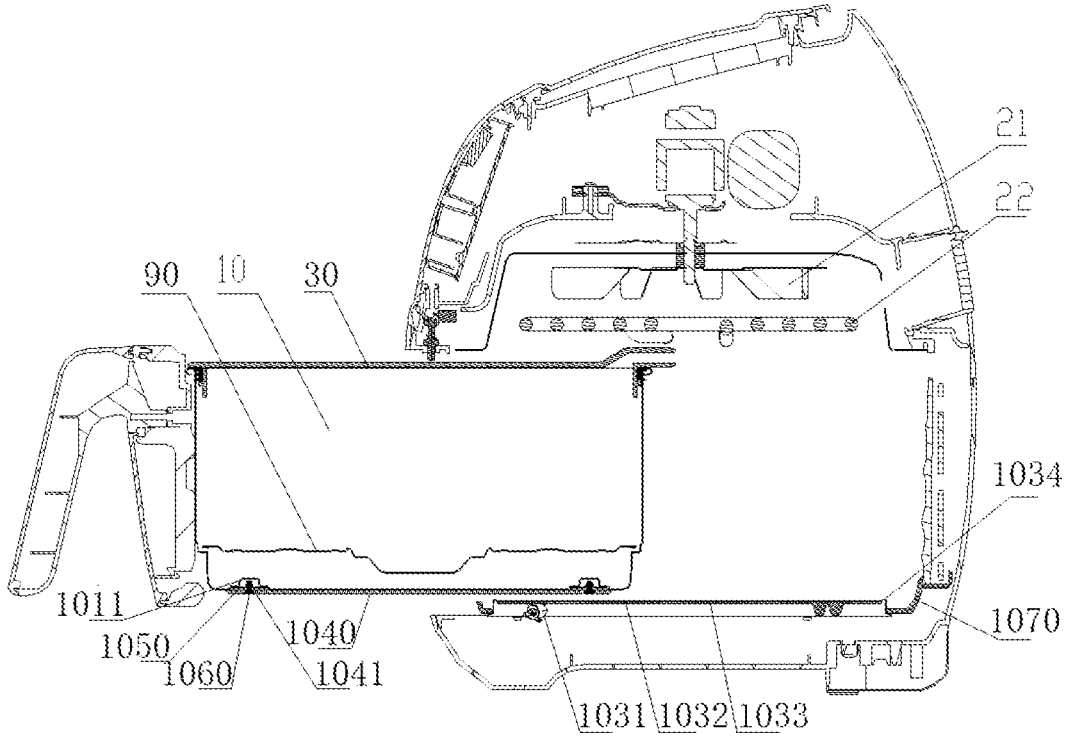
FIG. 12 is a structural schematic view when a basket is drawn out in the present disclosure.
Figure 13:
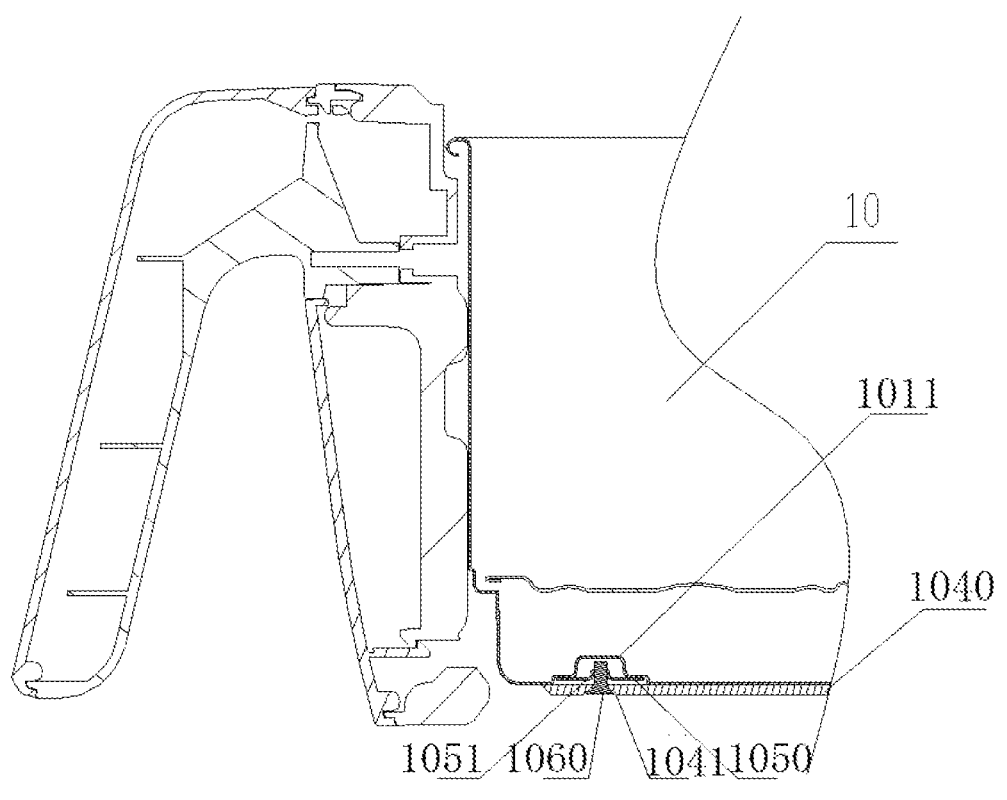
FIG. 13 is a structural schematic view of the basket of the present disclosure.

As shown in FIGS. 7-9, this embodiment provides an air outlet system of an air fryer having a detachable cover plate. A cooking cavity is provided inside the air fryer, and the cooking cavity is provided therein with a basket 10 and a hot air device 20. The basket 10 is of an upper opening structure, the hot air device 20 is located above the basket 10, and a detachable cover plate 30 is provided at an upper opening of the basket 10. When the cover plate 30 is installed on the basket 10, the interior of the basket 10 is hermetically isolated by the cover plate 30 from the hot air device 20. A gas outlet pipe 31 in communication with an inner cavity of the basket 10 is provided at an edge of the cover plate 30, and a first air outlet 140 making the gas outlet pipe 31 be in communication with the outside is provided on the air fryer. By providing the detachable cover plate 30 on the basket 10, when the cover plate 30 is detached, the interior of the basket 10 is in communication with the hot air device 20 and the conventional hot-air frying-and-baking function can be performed; after the cover plate 30 is installed, the interior of the basket 10 is hermetically isolated by the cover plate 30 from the hot air device 20, in this case, the broiling and baking or steaming function can be performed in the basket 10, the smoke and steam generated in the basket 10 are isolated by the cover plate 30 to avoid contact with the hot air device 20 and other electrical devices, thus, the service life and reliability of the air fryer will not be affected; meanwhile, the edge of the cover plate 30 is provided with the gas outlet pipe 31 in communication with the inner cavity of the basket 10, and the gas outlet pipe 31 is in communication with the outside through the first air outlet 140, then the smoke or steam generated during the broiling and baking or steaming function can be discharged, ensuring that corresponding functions are performed efficiently and reliably, therefore, the present solution ensures the practicability of the air fryer while enriching the functions of the air fryer.

In the present embodiment, a sealing ring is provided between the cover plate 30 and the basket 10. Specifically, a ring of installation groove is formed on a peripheral side of the cover plate 30, and the sealing ring is sleeved on the installation groove on the cover plate 30. When the cover plate 30 is installed on the basket 10, a sealing lip of the sealing ring is closely attached to an inner side wall of the opening of the basket 10, so that the cover plate 30 seals the whole opening of the basket 10, preventing the smoke and steam from diffusing out from the opening to affect other electrical devices.

In the present embodiment, a sealing gasket 150 is provided at a joint between the first air outlet 140 and the gas outlet pipe 31. When the cover plate 30 is not installed on the basket 10, the sealing gasket 150 blocks the first air outlet 140; and when the cover plate 30 is installed on the basket 10, the sealing gasket 150 is open, and the inner cavity of the basket 10 is in communication with the outside through the gas outlet pipe 31 and the first air outlet 140. That is, only when the cover plate 30 is installed on the basket 10, the sealing gasket 150 is open, and the inner cavity of the basket 10 is made to be in communication with the outside through the gas outlet pipe 31 and the first air outlet 140, then the smoke or steam generated during the broiling and baking or steaming function can be discharged (as shown in FIG. 7); and when the cover plate 30 is not installed on the basket 10, i.e., when the conventional hot-air frying and baking is carried out, the sealing gasket 150 blocks the first air outlet 140, avoiding loss of the hot air from the first air outlet 140, and thus ensuring the practicability of the product.

In the present embodiment, the sealing gasket 150 is formed by a plurality of flap-shaped sealing lips that can be turned outward. When the cover plate 30 is installed on the basket 10, the gas outlet pipe 31 on the cover plate 30 is inserted into the sealing gasket 150, and the plurality of flap-shaped sealing lips are pushed to be unfolded, in this case, the gas outlet pipe 31 is in communication with the first air outlet 140; and when the cover plate 30 is not installed on the basket 10, the plurality of flap-shaped sealing lips of the sealing gasket 150 which are not subjected to an external force gather together and block the first air outlet 140. The sealing gasket 150, adopting a structure of a plurality of flap-shaped sealing lips that can be turned outward, can also simplify the structure of the sealing gasket and reduce the cost while being capable of controlling to open or block the first air outlet 140 according to the installation state of the cover plate 30. Preferably, in the present embodiment, the sealing gasket 150 is formed by four flap-shaped sealing lips, and the four flap-shaped sealing lips form a cross-shaped structure, which is optimal from the view of structural complexity and sealing reliability. Without doubt, in other embodiments, the sealing gasket 150 also can be formed by other numbers of flap-shaped sealing lips that can be turned outward, which can also achieve the technical effect of controlling to open or block the first air outlet 140.

In the present embodiment, the air fryer further includes a bracket 160 for installing the first air outlet 140, and the sealing gasket 150 is clamped and fixed at a joint between the bracket 160 and the first air outlet 140. On one hand, the sealing gasket 150 can achieve sealed fit between the first air outlet 140 and the bracket 160, avoiding the leakage of smoke or steam from the joint into the air fryer; and on the other hand, the sealing gasket 150 is simple to assemble and easy to manufacture. The first air outlet 140 is provided with an installation groove corresponding to the sealing gasket 150, and the sealing gasket 150 is placed in the installation groove. In order to better compress the sealing gasket 150, a protruding compression bone (compression member) 161 corresponding to the sealing gasket 150 is provided on the bracket 160, and the compression bone 161 compresses and fixes the sealing gasket 150 in the installation groove.

In the present embodiment, the hot air device 20 includes a heat circulation fan 21 and a top heating pipe 22, wherein the heat circulation fan 21 is located right above the top heating pipe 22, the top heating pipe 22 is located right above the basket 10, the top heating pipe 22 can heat a circulating airflow driven by the heat circulation fan 21, and the heated hot airflow is blown into the basket 10, and can fry and bake the food in the basket. A hot air outlet 23 corresponding to the hot air device 20 is provided in an upper portion of the cooking cavity, the air fryer is provided with a second air outlet 170 making the hot air outlet 23 be in communication with the outside, and the hot air outlet 23 is provided on an air duct plate in the upper portion of the cooking cavity, which can discharge the smoke generated during the conventional hot-air frying and baking of food, so that the practicality thereof is stronger.

In the present embodiment, a cold air cavity is provided outside the cooking cavity, the cold air cavity is located outside the air duct plate, the cold air cavity is provided with a cold air outlet 24 in communication with the second air outlet 170, and the cold air outlet 24 is corresponding to a position of the hot air outlet 23, specifically, the cold air outlet 24 is located above the hot air outlet 23, therefore, the smoke discharged from the hot air outlet 23, when entering the second air outlet 170, will be mixed with cold air flowing in from the cold air outlet 24, and is finally discharged from the second air outlet 170 to the outside (as shown in FIG. 8), so that a temperature of a gas eventually discharged from the second air outlet 170 to the outside is greatly reduced, thus the gas discharged from the second air outlet 170 may be effectively prevented from scalding the user and wall temperature rise can be reduced.

In the present embodiment, an opening of the second air outlet 170 in communication with the outside is provided close to an opening of the first air outlet 140 in communication with the outside, thus it can avoid designing multiple openings on an outer wall of the air fryer and affecting the appearance of the product. Preferably, the first air outlet 140 and the second air outlet 170 are of a one-piece structure, i.e., an integrated structure, which, on one hand, can simplify the structure of the entire air outlet system, and reduce the production cost and the assembly cost, and on the other hand, ensures a beautiful appearance of the product and strong practicability.

In the present embodiment, a bottom heating device 80 capable of heating the basket 10 is provided at the bottom of the cooking cavity, and the bottom heating device 80 can provide heat for the broiling and baking or steaming function performed in the basket 10, so that the air fryer has richer cooking functions. Without doubt, a design position of the bottom heating device 80 in the present disclosure is not limited thereto, and in another embodiment, the bottom heating device capable of heating the basket 10 may be provided at a side portion of the cooking cavity, and it may also provide heat for the broiling and baking or steaming function performed in the basket 10.

In the present embodiment, a frying plate 90 is provided inside the basket 10, and the frying plate 90 is placed on a supporting portion on an inner side of the basket 10. The supporting portion is specifically a supporting step designed in a protruding manner. A gap exists between the frying plate 90 and a bottom surface of the basket 10, and food is placed on the frying plate 90. When in the steaming mode, an appropriate amount of water can be added into the basket 10. The water does not directly soak the food. After being heated, the water will form steam, and the steam will rise and come into contact with the food on the frying plate 90, so that the food can be steamed, or the food on the frying plate can be moisturized, thus, the usage scenarios of the basket can be enriched.

As shown in FIGS. 10-13, the present disclosure further provides an air fryer having a bottom heating system, including a cooking cavity provided inside the air fryer, and a basket 10 and a hot air device 20 provided inside the cooking cavity. The basket 10 is of an upper opening structure, the hot air device 20 is located above the basket 10, and a bottom heating device 1030 capable of heating the basket 10 is provided at the bottom of the cooking cavity. The bottom heating device 1030 includes a heating pipe 1031, a first thermally conductive aluminum plate 1032, and a metal shell 1033 which are connected in sequence from bottom to top, wherein the metal shell 1033 is provided at the bottom of the cooking cavity, and the basket 10 is supported on the metal shell 1033. The bottom heating device 1030 can directly heat the bottom of the basket 10 to broil and bake or steam food in the basket 10, thus the functions of the air fryer can be enriched; meanwhile, the heat of the bottom heating pipe 1031 is quickly and uniformly conducted by the first thermally conductive aluminum plate 1032, so that the temperature on the metal shell 1033 is higher and more uniform, thus having a better heating effect for the basket 10.

In the present embodiment, the hot air device 20 includes a heat circulation fan 21 and a top heating pipe 22, wherein the heat circulation fan 21 is located right above the top heating pipe 22, the top heating pipe 22 is located right above the basket 10, the top heating pipe 22 can heat a circulating airflow driven by the heat circulation fan 21, and the heated hot airflow is blown into the basket 10, and can fry and bake the food in the basket.

In the present embodiment, the bottom of the basket 10 is provided with a second thermally conductive aluminum plate 1040 closely attached to a bottom wall of the basket. The second thermally conductive aluminum plate 1040 is closely attached to and connected to the metal shell 1033, and can quickly and uniformly transfer the heat on the metal shell 1033 at the bottom of the basket 10 to the bottom wall of the basket 10, so that the food in the basket 10 can be better broiled and baked and steamed. In the present embodiment, installation bases 1050 are provided at the bottom of the basket 10, and the second thermally conductive plate 1040 is fixed on the installation bases 1050 through fasteners 1060. Specifically, a plurality of inner concave portions 1011 are provided on the bottom wall of the basket 10, the installation bases 1050 are provided in the inner concave portions 1011, the second thermally conductive plate 1040 is provided with installation holes 1041 corresponding to the installation bases 1050, and the fasteners 1060 penetrate through the installation holes 1041 to fix the second thermally conductive plate 1040 on the installation bases 1050. The bottom wall of the basket 10 is not directly perforated, but the inner concave portions 1011 are designed to accommodate the installation bases 1050, so that the bottom of the basket 10 has better sealing performance, and there is no risk such as oil leakage and water leakage. The installation bases 1050 can be adhered or welded in the inner concave portions 1011. The installation bases 1050 are completely embedded in the inner concave portions 1011, therefore, the second thermally conductive plate 1040 can be completely closely attached to the bottom wall of the basket 10, ensuring good heat conduction performance.

In the present embodiment, preferably, a threaded hole 1051 is provided on each installation base 1050, the fasteners 1060 are screws matched with the threaded holes 1051, the installation holes 1041 on the second thermally conductive plate 1040 are wedge-shaped holes, and nuts of the fasteners 1060 are embedded in the installation holes 1041. Firstly, the manner of fixing with screws is quite convenient and reliable, and also has a low cost; secondly, after the second thermally conductive plate 1040 is fixed by the fasteners 1060, nut parts at the ends of the fasteners are also completely embedded into the wedge-shaped installation holes 1041, so that the bottom of the basket is flat and easy to place, and meanwhile has a beautiful appearance.

In the present embodiment, a lower bracket 1070 is provided at the bottom of the air fryer, the metal shell 1033 is fixed on the lower bracket 1070, and an upper surface of the metal shell 1033 constitutes the bottom wall of the cooking cavity, thereby the structure of the whole cooking cavity can be simplified and meanwhile the heating effect at the bottom of the basket 10 is better; in addition, an edge of the metal shell 1033 is provided with an annular protruding rim 1034, and the bottom of the basket 10 is located in an area enclosed by the annular protruding rim 1034, which can further improve the heating efficiency.

In the present embodiment, a frying plate 90 is provided inside the basket 10, and the frying plate 90 is placed on a supporting portion on an inner side of the basket 10. The supporting portion is specifically a supporting step designed in a protruding manner. A gap exists between the frying plate 90 and a bottom surface of the basket 10, and food is placed on the frying plate 90. When in the steaming mode, an appropriate amount of water can be added into the basket 10. The water does not directly soak the food. After being heated, the water will form steam, and the steam will rise and come into contact with the food on the frying plate 90, so that the food can be steamed, or the food on the frying plate 90 can be moisturized, thus, the cooking functions of the basket can be enriched.

In the present embodiment, a detachable cover plate 30 is provided at an upper opening of the basket 10. When the cover plate 30 is installed on the basket 10, the interior of the basket 10 is hermetically isolated by the cover plate 30 from the hot air device 20, and when the cover plate 30 is detached from the upper opening of the basket 10, the interior of the basket 10 is in communication with the hot air device 20. It can be realized that when the cover plate 30 is detached, the interior of the basket 10 can be in communication with the hot air device 20 and the conventional hot-air frying-and-baking function can be performed; and after the cover plate 30 is installed, the interior of the basket 10 is hermetically isolated by the cover plate 30 from the hot air device 20 outside, in this case, cooking such as broiling and baking or steaming can be performed in the basket 10, the smoke and steam generated in the basket 10 are isolated by the cover plate 30, avoiding contact with the hot air device 20 and other electrical devices, thus, the service life and reliability of the air fryer will not be affected, that is, the practicability of the air fryer is ensured while the functions of the air fryer are enriched.

In another embodiment, the second thermally conductive plate 1040 is not fixed to the bottom of the basket through fasteners, but is adhered to the bottom wall of the basket 10, which not only can quickly and uniformly transfer the heat of the bottom heating device of the basket to the bottom wall of the basket 10, but also makes the structure of the basket as a whole simple and easy to produce. In addition, in the present embodiment, all of other structures are the same as those in the above first embodiment, and are not further repeated herein.

Figure 14:
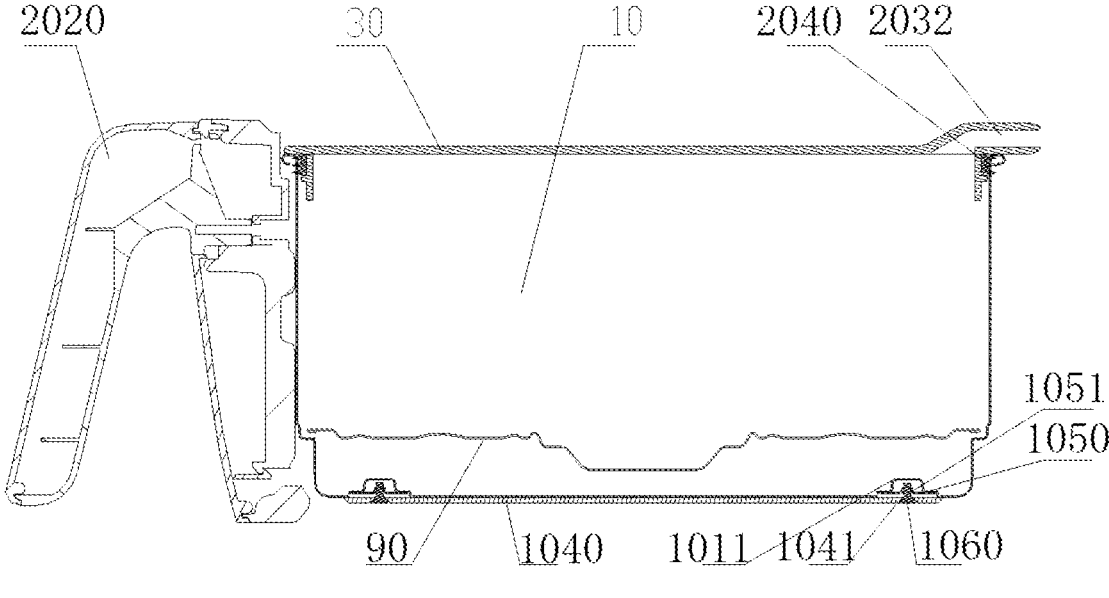
FIG. 14 is another structural schematic view of the basket of the present disclosure.
Figure 15:
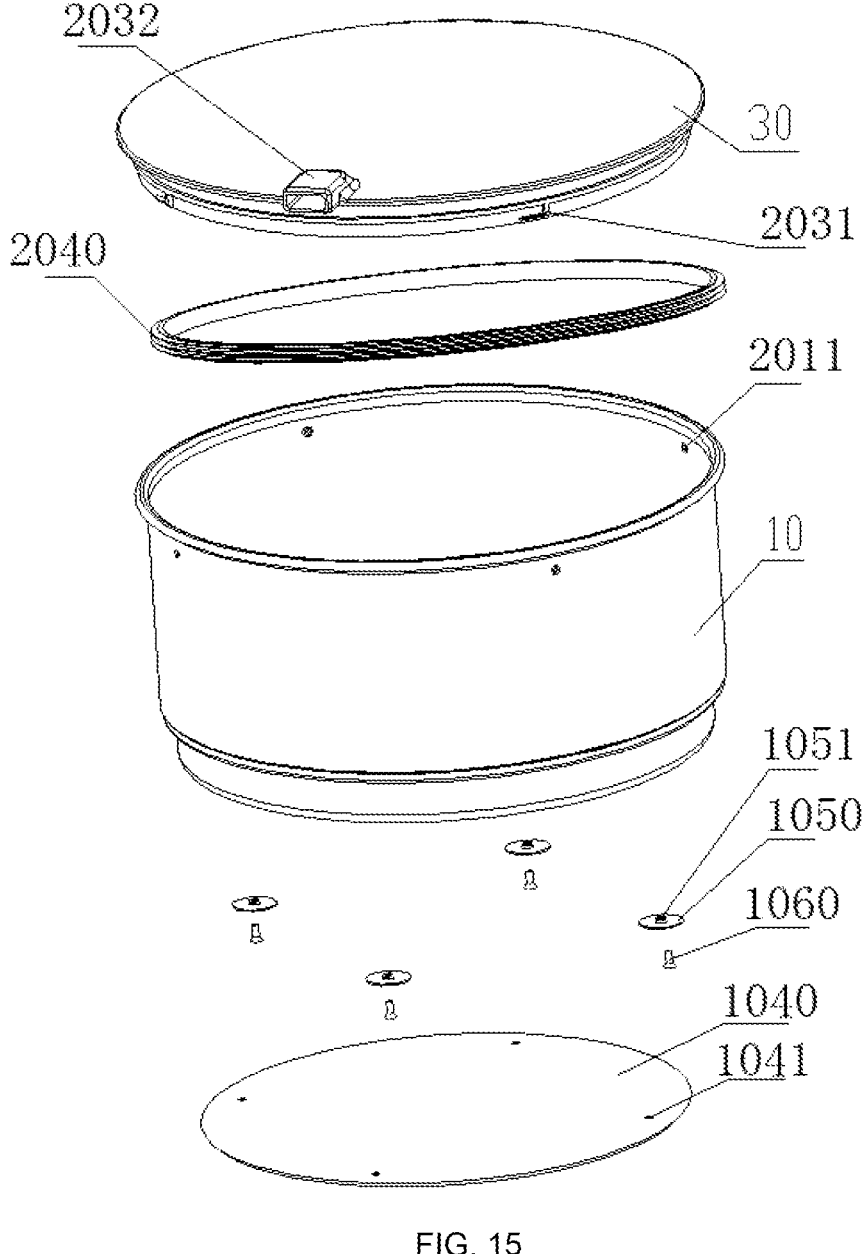
FIG. 15 is an exploded structural schematic view of the basket of the present disclosure.
Figure 16:
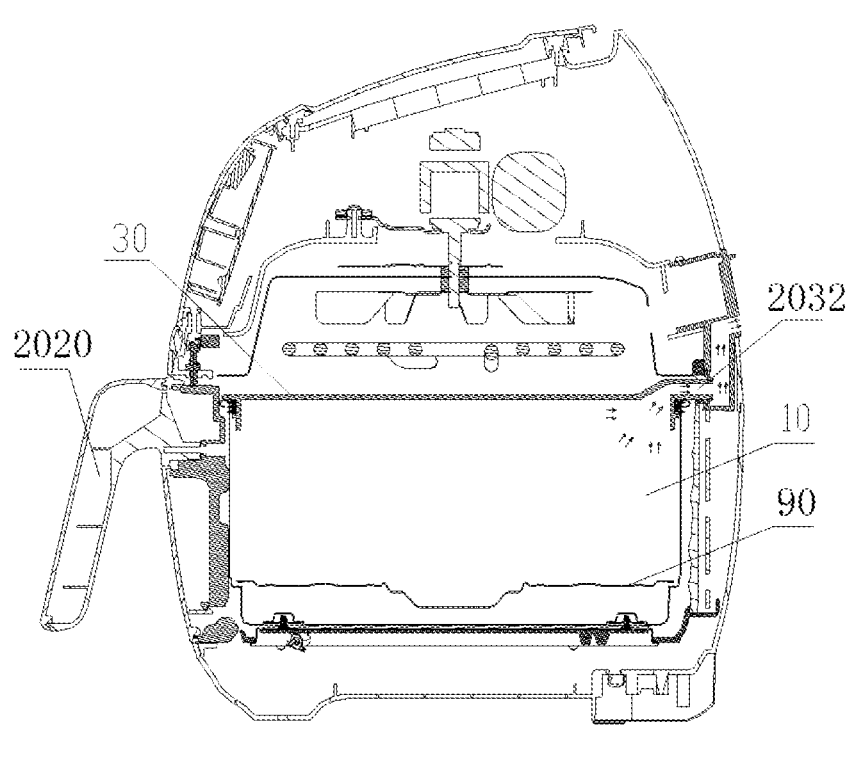
FIG. 16 is a structural schematic view when the basket is placed in the air fryer in the present disclosure.

As shown in FIGS. 14-16, this embodiment provides a basket with a detachable cover plate for an air fryer, including a basket 10 and a handle 2020 provided at a side of the basket 10. A top portion of the basket 10 is of an opening structure, a cover plate 30 matched with the opening is provided at the opening of the basket 10, and the cover plate 30 is detachably installed at the opening of the basket 10, so that it can be realized that when the cover plate 30 is detached, the interior of the basket 10 is in communication with the hot air device and the conventional hot-air frying-and-baking function can be performed; and after the cover plate 30 is installed, the interior of the basket 10 is hermetically isolated by the cover plate 30 from the external hot air device, in this case, cooking such as broiling and baking or steaming can be performed in the basket 10, the smoke and steam generated in the basket 10 are isolated by the cover plate 30, avoiding contact with the hot air device and other electrical devices, thus, the service life and reliability of the air fryer will not be affected, that is, the practicability of the air fryer is ensured while the functions of the air fryer are enriched.

In the present embodiment, a sealing ring 2040 is provided between the cover plate 30 and the basket 10. Specifically, a ring of installation groove is formed on a peripheral side of the cover plate 30, and the sealing ring 2040 is sleeved on the installation groove on the cover plate 30. When the cover plate 30 is installed on the basket 10, a sealing lip of the sealing ring 2040 is closely attached to an inner side wall of the opening of the basket 10, so that the cover plate 30 seals the whole opening of the basket 10, preventing the smoke and steam from diffusing out from the opening to affect other electrical devices.

In the present embodiment, the cover plate 30 is snapped with the basket 10, one of the cover plate 30 and the basket 10 is provided with a clamping groove 2031, and the other is provided with a clamping position 2011 corresponding to the clamping groove 2031. The snapping fit is convenient to disassemble and assemble. A specific structure of the present embodiment is that a plurality of clamping grooves 2031 opening in the same rotation direction are provided at intervals on a peripheral side of the cover plate 30, a plurality of corresponding clamping positions 2011 designed in a protruding manner are provided on a side wall of the basket 10, and the clamping grooves 2031 are rotatably snapped with the clamping positions 2011, thereby on one hand, the structure can be simplified, facilitating the integrated molding of the clamping grooves 2031 and the cover plate 30, and also facilitating the integrated molding of the clamping positions 2011 and the basket body; meanwhile, the clamping positions 2011 and clamping grooves 2031 circumferentially provided at intervals can ensure the reliability of the fit between the cover plate 30 and the basket 10; besides, by rotating the cover plate 30, it can be realized that the clamping grooves 2031 are snapped with the clamping positions 2011, i.e., the installation of the cover plate 30 is realized, and by rotating the cover plate 30, it also can be realized that the clamping grooves 2031 are separated from the clamping positions 2011, i.e., the cover plate 30 is detached. On the whole, it is not only simple in structure, but also easy to disassemble and assemble.

In the present embodiment, as shown in FIG. 16, the basket is a drawer-type basket, a gas outlet pipe 2032 is provided at an edge of the cover plate 30, the gas outlet pipe 2032 is in communication with an inner cavity of the basket 10, the gas outlet pipe 2032 is provided at a side opposite to the handle 2020, and the gas outlet pipe 2032 is configured to guide out smoke and steam generated by broiling and baking and steaming food in the basket 10, ensuring healthy, safe, and efficient cooking. The gas outlet pipe 2032 is provided at a side opposite to the handle 2020, therefore, when the drawer-type basket is pushed into the cooking cavity of the air fryer by the handle 2020, the gas outlet pipe 2032 is moved forward so that the gas outlet pipe can be better matched with a gas outlet channel on the air fryer; on the other hand, the gas outlet pipe 2032 also serves as a grip portion when the cover plate 30 is being disassembled and assembled. By designing the gas outlet pipe at a side opposite to the handle 2020, a user can conveniently fix the basket 10 with one hand by the handle 2020, and can disassemble and assemble the cover plate 30 by rotating the cover plate 30 by gripping the gas outlet pipe 2032 with one hand. The whole structure design is smart, and has quite high practicability.

In the present embodiment, the bottom of the basket 10 is provided with the second thermally conductive plate 1040 closely attached to the bottom wall of the basket body. The thermally conductive plate 1040 is preferably a thermally conductive aluminum plate, which can quickly and uniformly transfer the heat of the bottom heating device of the basket to the bottom wall of the basket 10, so that food in the basket 10 can be better broiled and baked and steamed. In the present embodiment, installation bases 1050 are provided at the bottom of the basket 10, and the thermally conductive plate 1040 is fixed on the installation bases 1050 through fasteners 1060. Specifically, a plurality of inner concave portions 1011 are provided on the bottom wall of the basket 10, the installation bases 1050 are provided in the inner concave portions 1011, the thermally conductive plate 1040 is provided with installation holes 1041 corresponding to the installation bases 1050, and the fasteners 1060 penetrate through the installation holes 1041 to fix the thermally conductive plate 1040 on the installation bases 1050. The bottom wall of the basket 10 is not directly perforated, but the inner concave portions 1011 are designed to accommodate the installation bases 1050, so that the bottom of the basket 10 has better sealing performance, and there is no risk such as oil leakage and water leakage. The installation bases 1050 can be adhered or welded in the inner concave portions 1011. The installation bases 1050 are completely embedded in the inner concave portions 1011, therefore, the thermally conductive plate 1040 can be completely closely attached to the bottom wall of the basket 10, ensuring good heat conduction performance.

In the present embodiment, preferably, a threaded hole 1051 is provided on each installation base 1050, the fasteners 1060 are screws matched with the threaded holes 1051, the installation holes 1041 on the thermally conductive plate 1040 are wedge-shaped holes, and nuts of the fasteners 1060 are embedded in the installation holes 1041. Firstly, the manner of fixing with screws is quite convenient and reliable, and also has a low cost; secondly, after the thermally conductive plate 1040 is fixed by the fasteners 1060, nut parts at the ends of the fasteners are also completely embedded into the wedge-shaped installation holes 1041, so that the bottom of the basket is flat and easy to place, and meanwhile has a beautiful appearance.

In the present embodiment, a frying plate 90 is provided inside the basket 10, and the frying plate 90 is placed on a supporting portion on an inner side of the basket 10. The supporting portion is specifically a supporting step designed in a protruding manner. A gap exists between the frying plate 90 and a bottom surface of the basket 10, and food is placed on the frying plate 90. When in the steaming mode, an appropriate amount of water can be added into the basket 10. The water does not directly soak the food. After being heated, the water will form steam, and the steam will rise and come into contact with the food on the frying plate 90, so that the food can be steamed, or the food on the frying plate 90 can be moisturized, thus, the usage scenarios of the basket can be enriched.

In another embodiment, the thermally conductive plate 1040 is not fixed to the bottom of the basket body through fasteners 1060, but is adhered to the bottom wall of the basket 10, which not only can quickly and uniformly transfer the heat of the bottom heating device of the basket to the bottom wall of the basket 10, but also makes the structure of the basket as a whole simple and easy to produce. In addition, in the present embodiment, all of other structures are the same as those in the above first embodiment, and are not further repeated herein.

Although the present disclosure has been described above with reference to the embodiments, various improvements may be made to the present disclosure and components therein may be replaced by equivalents, without departing from the scope of the present disclosure. In particular, as long as there is no structural conflict, various features in the embodiments disclosed in the present disclosure may be used in combination with each other in any manner, while these combinations are not exhaustively described in the present description only for the sake of saving spaces and resources. Therefore, the present disclose is not restricted to specific embodiments disclosed herein, but covers all technical solutions falling within the scope of the claims.

INDUSTRIAL APPLICABILITY

In the air fryer of the present disclosure, by providing the detachable cover plate on the basket, it can be realized that when the cover plate is detached, the interior of the basket is in communication with the hot air device and the conventional hot-air frying-and-baking function can be performed; after the cover plate is installed, the interior of the basket is hermetically isolated by the cover plate from the hot air device, in this case, the broiling and baking or steaming function can be performed in the basket, without affecting the service life and reliability of the hot air device, that is, the functions of the air fryer can be enriched; meanwhile, the edge of the cover plate is provided with the gas outlet pipe in communication with the inner cavity of the basket, the gas outlet pipe is in communication with the outside through the first air outlet, then the smoke or steam generated during the broiling and baking or steaming function can be discharged, ensuring that corresponding functions are performed efficiently and reliably. Besides, the bottom heating device capable of heating the basket is provided at the bottom and/or the side portion of the cooking cavity, can provide heat for the broiling and baking or steaming function performed in the basket, and simplifies the product structure; by detecting whether the cover plate is in an installation state by the cover plate sensing system, and controlling the air fryer to start the hot air device starting mode and the bottom heating device starting mode according to the installation state of the cover plate, the air fryer product can be more intelligent, and meanwhile it avoids starting the steaming function when the cover plate is not installed, that is, avoiding the steam from damaging and affecting the hot air device and other electrical devices, thus rendering stronger practicability to the product; the cover plate sensing system includes the micro-switch assembly and the ejector rod, wherein the ejector rod is configured to mechanically contact the cover plate to produce displacement, and push the micro-switch assembly to produce a corresponding judgment signal, with a simple and reliable structure; besides, when the cover plate is not installed on the basket, the ejector rod further can be snapped in the limiting groove on the basket to limit the basket, which can further improve the practicability of the product; the sealing gasket is provided at the joint between the first air outlet and the gas outlet pipe, only when the cover plate is installed on the basket, the sealing gasket is open, and allows the inner cavity of the basket to be in communication with the outside through the gas outlet pipe and the first air outlet, then the smoke or steam generated during the broiling and baking or steaming function can be discharged; and when the cover plate is not installed on the basket, i.e., when the conventional hot-air frying and baking is carried out, the sealing gasket blocks the first air outlet, avoiding loss of the hot air from the first air outlet, and thus ensuring the practicability of the product. Besides, during the conventional hot-air frying and baking, the smoke and the exhaust can be discharged through the hot air outlet and the second air outlet, preferably being mixed with cold air before being discharged, with quite strong practicability. Meanwhile, the opening of the second air outlet is provided close to the opening of the first air outlet, and the first air outlet and the second air outlet are of a one-piece structure, so that the structure is simple and convenient to install, and meanwhile the appearance of the product is more beautiful; the sealing gasket is formed by a plurality of flap-shaped sealing lips that can be turned outward, and when the cover plate is installed on the basket, the gas outlet pipe is inserted into the sealing gasket, the plurality of flap-shaped sealing lips are pushed to expand, and the gas outlet pipe is in communication with the first air outlet; and when the cover plate is not installed on the basket, the plurality of flap-shaped sealing lips gather together and block the first air outlet, then the sealing gasket has a simple structure and a low cost, and the sealing is reliable; the bottom heating system can directly heat the bottom of the basket to broil and bake or steam the food in the basket, then the functions of the air fryer can be enriched; meanwhile, the heat of the bottom heating pipe is quickly and uniformly conducted by the first thermally conductive aluminum plate, so that the temperature on the metal shell is higher and more uniform, and thus the heating effect on the basket is better; further, the bottom of the basket is provided with the second thermally conductive aluminum plate/thermally conductive plate, which can further improve the heat conduction efficiency and ensure a better heating effect; the thermally conductive plate is closely fixed on the bottom wall of the basket body through the fasteners, and the nuts of the fasteners are embedded in the installation holes, so that the bottom of the basket is flat, thereby facilitating placement and meanwhile providing a beautiful appearance; the metal shell is fixed on the lower bracket, and the upper surface of the metal shell forms the bottom wall of the cooking cavity, which can simplify the structure of the whole cooking cavity and has a better bottom heating effect; in addition, the edge of the metal shell is provided with the annular protruding rim, and the bottom of the basket is located in the area enclosed by the annular protruding rim, which can further improve the heating efficiency; the cover plate is installed on the basket body in a rotary snapping manner, which is quite convenient to disassemble and assemble; and meanwhile, the edge of the cover plate is provided with the gas outlet pipe, which can guide out the steam and the like generated when cooking food by the basket body, making the cooking more efficient and more reliable.

What is claimed is:

1. An air fryer comprising a cooking cavity located inside the air fryer, and a basket and a hot air device provided inside the cooking cavity, the hot air device is located above the basket, the basket comprises a basket body and a handle provided at a side of the basket body, a top portion of the basket body is of an opening structure, a cover plate matched with an opening is provided at the opening of the basket, and the cover plate is detachably installed at the opening of the basket, when the cover plate is installed on an upper opening of the basket, an interior of the basket is hermetically isolated by the cover plate from the hot air device, and when the cover plate is detached from the upper opening of the basket, the interior of the basket is in communication with the hot air device, a gas outlet pipe in communication with an inner cavity of the basket is provided at an edge of the cover plate, and a first air outlet making the gas outlet pipe be in communication with an exterior environment is provided on the air fryer, wherein a sealing gasket is provided at a joint between the first air outlet and the gas outlet pipe, the sealing gasket formed from a plurality of flap-shaped sealing lips that are outwardly movable, when the cover plate is not installed on the basket, the plurality of flap-shaped sealing lips of the sealing gasket gather together to block the first air outlet; and when the cover plate is installed on the basket, the gas outlet pipe is inserted into the sealing gasket, the plurality of flap-shaped sealing lips are urged into an unfolded position to place the gas outlet pipe in communication with the first air outlet and the inner cavity of the basket is in communication with the exterior environment through the gas outlet pipe and the first air outlet.

2. The air fryer according to claim 1, wherein a bottom heating device capable of heating the basket is provided at a bottom and/or a side portion of the cooking cavity.

3. The air fryer according to claim 2, wherein the bottom heating device capable of heating the basket is provided at the bottom of the cooking cavity, the bottom heating device comprises a heating pipe, a first thermally conductive aluminum plate and a metal shell which are connected in sequence from bottom to top, the metal shell is provided at the bottom of the cooking cavity, and the basket is supported on the metal shell.

4. The air fryer according to claim 2, wherein the air fryer further comprises a control system and a cover plate sensing system electrically connected with each other, the cover plate sensing system is provided correspondingly to the cover plate, when the cover plate is installed on the basket, the cover plate sensing system outputs a first signal to the control system; and when the cover plate is not installed on the basket, the cover plate sensing system outputs a second signal to the control system.

5. The air fryer according to claim 4, wherein the control system has a hot air device starting mode and a bottom heating device starting mode, wherein when receiving the first signal, the control system controls to enter the bottom heating device starting mode; and when receiving the second signal, the control system controls to enter the hot air device starting mode, or controls to enter the hot air device starting mode and the bottom heating device starting mode at the same time.

6. The air fryer according to claim 4, wherein the cover plate sensing system comprises a micro-switch assembly and an ejector rod, the micro-switch assembly is electrically connected to the control system, and two ends of the ejector rod are respectively provided correspondingly to the micro-switch assembly and the cover plate, wherein when the cover plate is installed on the basket, the ejector rod has one end abutting against the cover plate, and the other end driving the micro-switch assembly to be in a first position state, and the micro-switch assembly outputs the first signal to the control system; and when the cover plate is not installed on the basket, the cover plate does not abut against the ejector rod, the micro-switch assembly changes to a second position state, and the micro-switch assembly outputs the second signal to the control system.

7. The air fryer according to claim 1, wherein a hot air outlet corresponding to the hot air device is provided in an upper portion of the cooking cavity, and the air fryer is provided with a second air outlet making the hot air outlet be in communication with the exterior environment; and a cold air cavity is provided outside the cooking cavity, the cold air cavity is provided with a cold air outlet in communication with the second air outlet, and the cold air outlet is located correspondingly to a position of the hot air outlet.

8. The air fryer according to claim 7, wherein an opening of the second air outlet in communication with the exterior environment is provided as sharing a cavity with an opening of the hot air outlet in communication with the exterior environment.

9. The air fryer according to claim 7, wherein the hot air outlet and the second air outlet are of a one-piece structure.

10. The air fryer according to claim 1, wherein the cover plate is snapped with the basket body, and one of the cover plate and the basket body defines a clamping groove, and the other is provided with a clamping position corresponding to the clamping groove, wherein a plurality of clamping grooves opening in a same rotation direction are provided at intervals on a peripheral side of the cover plate, a plurality of corresponding clamping positions designed in a protruding manner are provided on a side wall of the basket body, and the clamping grooves are rotatably snapped with the clamping positions.

11. The air fryer according to claim 10, wherein the basket is a drawer-type basket, and the gas outlet pipe is provided at a side opposite to the handle, wherein a bottom of the basket body is provided with a thermally conductive plate attached to a bottom wall of the basket body, wherein a plurality of inner concave portions are provided on the bottom wall of the basket body, installation bases are provided in the inner concave portions, the thermally conductive plate is provided with installation holes corresponding to the installation bases, and fasteners penetrate through the installation holes to fix the thermally conductive plate on the installation bases, wherein threaded holes are provided on the installation bases, the fasteners are screws matched with the threaded holes, the installation holes are wedge-shaped holes, and nuts of the fasteners are embedded in the installation holes.

* * * * *